US012741212B2

(12) United States Patent
Dong et al.

(10) Patent No.: US 12,741,212 B2
(45) Date of Patent: Sep. 22, 2026

(54) METHOD AND APPARATUS FOR DISPLAYING PROMPT INFORMATION, DEVICE, AND STORAGE MEDIUM

(71) Applicant: TENCENT TECHNOLOGY (SHENZHEN) COMPANY LIMITED, Shenzhen (CN)

(72) Inventors: Zexian Dong, Shenzhen (CN); Wanna Jin, Shenzhen (CN); Xin Chen, Shenzhen (CN); Jinle Fang, Shenzhen (CN); Yi Wang, Shenzhen (CN); Kun Liu, Shenzhen (CN); Hang Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 484 days.

(21) Appl. No.: 18/344,175

(22) Filed: Jun. 29, 2023

(65) Prior Publication Data

US 2023/0347241 A1 Nov. 2, 2023

Related U.S. Application Data

(63) Continuation of application No. PCT/CN2022/099836, filed on Jun. 20, 2022.

(30) Foreign Application Priority Data

Aug. 11, 2021 (CN) ......................... 202110921494.7

(51) Int. Cl.
*A63F 13/533* (2014.01)
*A63F 13/5375* (2014.01)

(52) U.S. Cl.
CPC ........ *A63F 13/533* (2014.09); *A63F 13/5375* (2014.09)

(58) Field of Classification Search
CPC ........................... A63F 13/533; A63F 13/5375
See application file for complete search history.

(56) References Cited

U.S. PATENT DOCUMENTS 5,720,663 A * 2/1998 Nakatani ................ A63F 13/69 463/23
2005/0137015 A1 6/2005 Rogers et al.
(Continued)

FOREIGN PATENT DOCUMENTS

CN 112203153 A 1/2021
CN 112915538 A 6/2021
(Continued)

OTHER PUBLICATIONS

The World Intellectual Property Organization (WIPO) International Search Report for PCT/CN2022/099836 Aug. 30, 2022 13 Pages (including translation).

(Continued)

*Primary Examiner* — Ankit B Doshi
(74) *Attorney, Agent, or Firm* — Anova Law Group, PLLC

(57) ABSTRACT

This application discloses a method and apparatus for displaying prompt information, a device, and a storage medium, and belongs to the field of graphical user interfaces. The method for displaying prompt information in a computer game includes obtaining an attribute of a first virtual character selected by a teammate for a team lineup; displaying, after a selection operation on a candidate virtual character by a user of the terminal, prompt information based on the attribute of the first virtual character and an attribute of the candidate virtual character; and selecting the candidate virtual character as a second virtual character for the team lineup in response to a confirmation operation received by the terminal.

20 Claims, 16 Drawing Sheets

(56) References Cited

U.S. PATENT DOCUMENTS

| | | | | |
|---|---|---|---|---|
| 2008/0161113 | A1* | 7/2008 | Hansen | A63F 13/335 463/42 |
| 2022/0096930 | A1* | 3/2022 | Shen | A63F 13/52 |
| 2022/0370917 | A1* | 11/2022 | Dong | A63F 13/822 |
| 2022/0379211 | A1 | 12/2022 | Fan et al. | |
| 2022/0410007 | A1* | 12/2022 | Jia | A63F 13/56 |

FOREIGN PATENT DOCUMENTS

| | | | |
|---|---|---|---|
| CN | 113181547 | A | 7/2021 |
| CN | 113181647 | A | 7/2021 |
| CN | 113599819 | A | 11/2021 |
| JP | 2023533408 | A | 8/2023 |

OTHER PUBLICATIONS

The Japan Patent Office (JPO) Notice of Reasons for Refusal for Application No. 2023-571137 Dec. 3, 2024 12 Pages (including translation).

* cited by examiner

METHOD AND APPARATUS FOR DISPLAYING PROMPT INFORMATION, DEVICE, AND STORAGE MEDIUM

RELATED APPLICATIONS

This application is a continuation of PCT Application No. PCT/CN2022/099836, filed om Jun. 20, 2022, which in turn claims priority to Chinese Patent Application No. 202110921494.7, entitled "DISPLAY METHOD AND APPARATUS FOR PROMPT INFORMATION, DEVICE, AND STORAGE MEDIUM", and filed on Aug. 11, 2021. The two applications are both incorporated herein by reference in their entirety.

FIELD OF THE TECHNOLOGY

Embodiments of this application relate to the field of graphical user interfaces, and in particular, to a method and apparatus for displaying prompt information, a device, and a storage medium.

BACKGROUND OF THE DISCLOSURE

A battle game is a game in which a plurality of user accounts competes in the same scene. For example, the battle game may be a multiplayer online battle arena (MOBA) game.

In a MOBA game, a game client provides a user with at least one candidate virtual character to choose from during ban-pick stage, and the game client displays an avatar of the candidate virtual character on a user interface at the stage. The user can select the virtual character to be used in the coming game by clicking on the avatar of a candidate virtual character.

Since five teammates of a friendly camp can choose different virtual characters, the user and the teammates can easily choose the virtual characters with duplicate categories, e,g, branch attributes. The user and the teammates need to make multiple rounds of choices and adjustments to finally reach a reasonable match lineup. The human-computer interaction in the selection process is cumbersome.

SUMMARY

This application provides a method and apparatus for displaying prompt information, a device, and a storage medium. The technical solution is as follows:

One aspect of this application provides a method for displaying prompt information performed by a terminal. The method for displaying prompt information in a computer game includes obtaining an attribute of a first virtual character selected by a teammate for a team lineup; displaying, after a selection operation on a candidate virtual character by a user of the terminal, prompt information based on the attribute of the first virtual character and an attribute of the candidate virtual character; and selecting the candidate virtual character as a second virtual character for the team lineup in response to a confirmation operation received by the terminal.

Another aspect of this application provides a computer device, the computer device including: a processor and a memory, the memory storing at least one program, the at least one program being loaded and executed by the processor to perform the method for displaying prompt information described in the foregoing aspects.

Another aspect of this application provides a non-transitory computer-readable storage medium, the computer-readable storage medium storing at least one instruction, at least one program, a code set, or an instruction set, the at least one instruction, the at least one program, the code set, or the instruction set being loaded and executed by a processor to perform the method for displaying prompt information described in the foregoing aspects.

In embodiments consistent with the present disclosure, the terminal displays the virtual character selection interface of the current game. The virtual character selection interface is divided into a selected character region and a candidate character region. The avatar of the first virtual character selected by the friend is displayed in the friendly avatar area in the selected character region, and the avatar of a candidate virtual character is displayed in the candidate character region. Based on the branch attribute of the first virtual character, the display content in the candidate character region is updated, so that a user can timely check whether the branch attribute of the virtual character selected by him is the same as the branch attribute of the virtual character selected by the friend when selecting the virtual character, and then select a virtual character to form a reasonable battle lineup with the virtual character selected by the friend. This avoids the occurrence of the user and teammates independently selecting the virtual character and finding that the lineup is unreasonable, and the subsequent adjustments needed to improve the efficiency of human-computer interaction.

DESCRIPTION OF EMBODIMENTS

Figure 1:
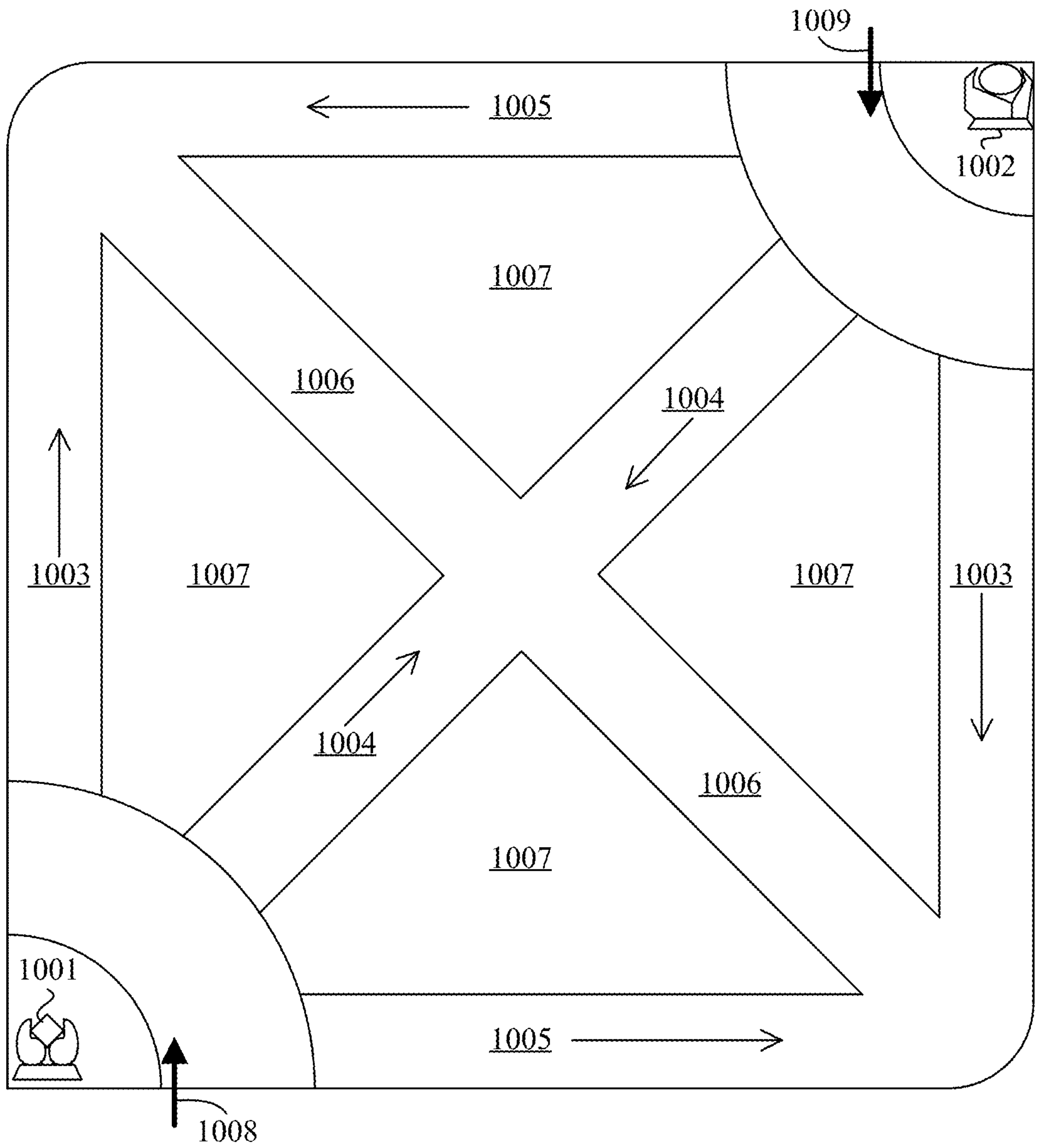
FIG. 1 is a two-dimensional map of a virtual world of a MOBA game according to an embodiment of this application.

First, terms involved in the embodiments of this application are introduced:

Virtual environment: A virtual environment is displayed (or provided) when an application program runs on a terminal. The virtual environment may be a simulated world of a real world, or may be a semi-simulated semi-fictional three-dimensional world, or may be an entirely fictional three-dimensional world. The virtual environment may be a two-dimensional virtual environment, a 2.5-dimensional virtual environment, or a three-dimensional virtual environment. In some embodiments, the virtual environment is further used for a virtual environment battle between virtual characters, and there are virtual resources available to the virtual characters in the virtual environment. In some embodiments, the virtual environment includes a lower left corner region and an upper right corner region that are symmetrical. Virtual characters on two opposing sides may occupy the regions respectively, and the objective of each side may be to destroy a target building, a fort, a base, or a crystal deep in the region of the component to win victory.

Virtual character: A virtual character is a movable object in a virtual environment. The movable object may be at least one of a virtual character, a virtual animal, and an animated human character. In some embodiments, when the virtual environment is a three-dimensional virtual environment, virtual characters may be three-dimensional models. Each virtual character has a shape and a volume in the three-dimensional virtual environment, and occupies some space in the three-dimensional virtual environment. In some embodiments, the virtual character is a three-dimensional character constructed based on the three-dimensional human skeleton technology. The virtual character wears different skins to implement different appearances. In some embodiments, the virtual character may be alternatively implemented by using a 2.5-dimensional model or a two-dimensional model. This is not limited to the embodiments of this application.

MOBA: A MOBA is an arena in which different virtual teams on at least two opposing camps occupy respective map regions in a virtual environment, and compete against each other using a specific victory condition as a goal. The victory condition includes, but is not limited to at least one of occupying a fort or destroying a fort of the opposing camp, killing virtual characters in the opposing camp, ensuring own survival in a specified scene and time, seizing a specific resource, or outscoring the opponent within a specified time. The battle arena game may take place in rounds. The same map or different maps may be used in different rounds of the battle arena game. Each virtual team includes one or more virtual characters. For example, a virtual team can include 1 virtual character, 2 virtual characters, 3 virtual characters, or 5 virtual characters.

Character selection stage: A character selection stage is a stage in which the user selects the virtual character used of a current game in a MOBA game.

Avatar: An avatar is a presented style of the virtual character selected by the user at the character selection stage of the user in a MOBA game.

A MOBA game is introduced as follows.

FIG. 1 is a two-dimensional map of a virtual world of a MOBA game. In this MOBA game, virtual characters are divided into two camps: a red camp and a blue camp. Each camp has five virtual characters, and a total of ten virtual characters play a MOBA game together.

As shown in FIG. 1, the virtual world map is square and divided into the following parts. There are two camps of bases (crystal) at both ends of a diagonal of the square, that is, a blue base 1001 and a red base 1002. Three attack routes that connect the blue base 1001 and the red base 1002 respectively are: an upper route 1003, a middle route 1004, and a down route 1005. Public region: river channel 1006, and a wild region 1007.

The virtual characters of the two camps are born in their respective base positions. The five virtual characters of the same camp attack the enemy along three attack directions respectively, and destroy the base of the other camp to win the game. The blue camp is born in blue base 1001, the red camp is born in the red base 1002, and the virtual characters of both camps observe the virtual world from the perspective of their own base in the lower left corner of the observation perspective. That is, the blue virtual characters observe the virtual world from a first perspective 1008, and the red virtual characters observe the virtual world from a second perspective 1009. According to their respective perspective, the three attack directions from left to right are an upper route, a middle route, and a down route.

Figure 2:
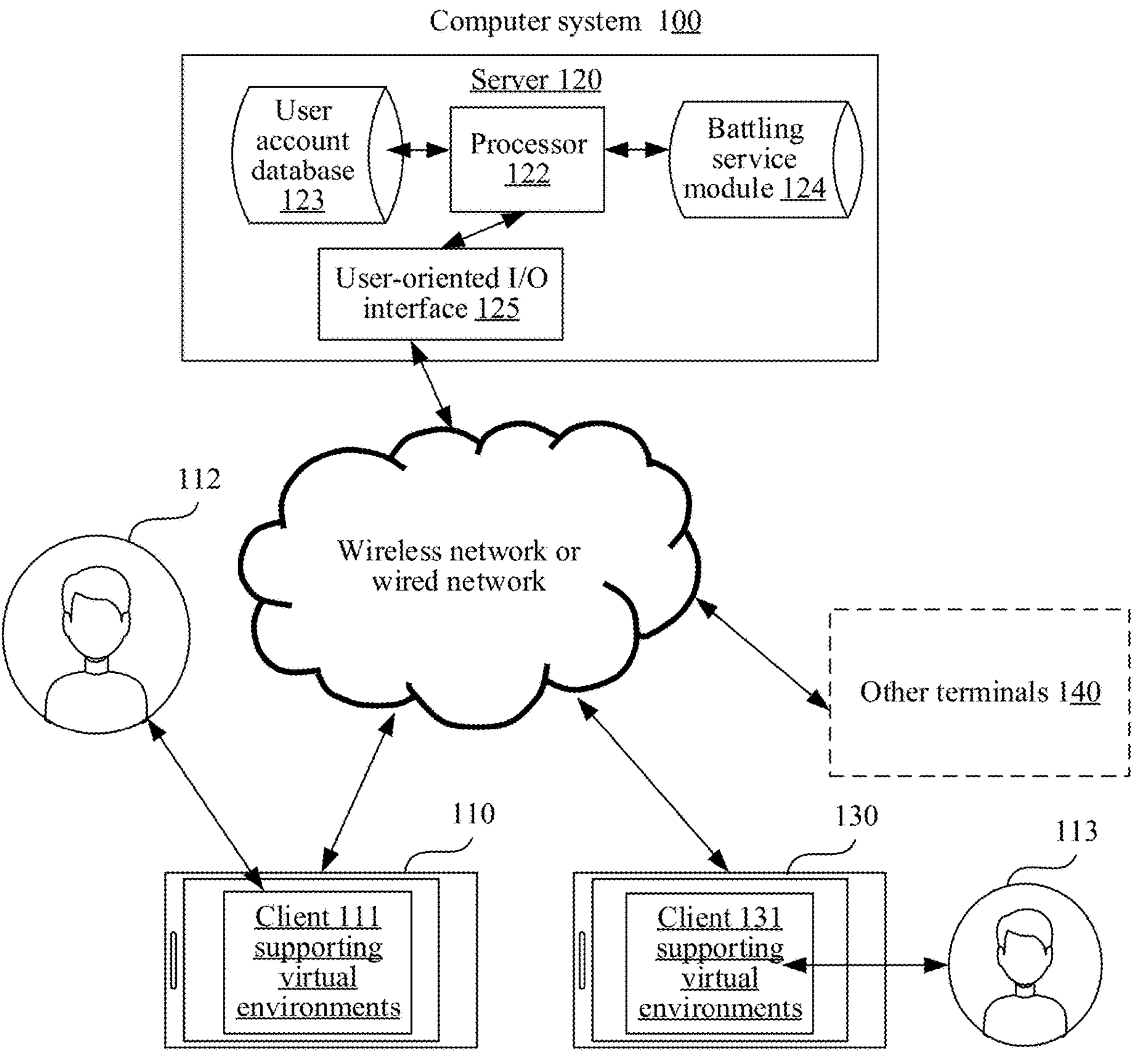
FIG. 2 is a structural block diagram of a computer system according to an embodiment of this application.

FIG. 2 is a structural block diagram of a computer system according to an embodiment of this application. A computer system 100 includes: a first terminal 110, a server 120, and a second terminal 130.

Client 111 supporting a virtual environment is installed and run on the first terminal 110, and the client 111 may be a multiplayer online battle program. When the first terminal 110 runs client 111, a user interface of the client 111 is displayed on a screen of the first terminal 110. The client 111 may be any one of a virtual reality (VR) application program, an augmented reality (AR) program, a virtual reality game, an augmented reality game, a first-person shooting (FPS) game, a third-personal shooting (TPS) game, a MOBA game, and a simulation game (SLG). In this embodiment, an example in which the client 111 is a MOBA game is used for description. The first terminal 110 is a terminal used by a first user 112. The first user 112 uses the first terminal 110 to control a first virtual character located in the virtual environment to perform activities, and the first virtual character may be referred to as a master virtual character of the first user 112. The activity of the first virtual character includes, but is not limited to: at least one of moving, jumping, transferring, releasing skills, adjusting body postures, crawling, walking, running, riding, flying, driving, picking, shooting, attacking, and throwing. For example, the first virtual character may be a simulated person character or a cartoon person character.

Client 131 supporting a virtual environment is installed and run on the second terminal 130, and client 131 may be a multiplayer online battle program. When the second terminal 130 runs client 131, a UI of the client 131 is displayed on a screen of the second terminal 130. Client 131 may be any one of a VR application program, an AR program, a VR game, an AR game, an FPS game, a TPS game, a MOBA game, and an SLG. In this embodiment, an example in which a client is a MOBA game is used for description. The second terminal 130 is a terminal used by a second user 113. The second user 113 uses the second terminal 130 to control a second virtual character located in the virtual environment to perform activities, and the second virtual character may be referred to as a master virtual character of the second user 113. For example, the second virtual character may be a simulated person character or a cartoon person character.

In some embodiments, the first virtual character and the second virtual character are located in the same virtual environment. In some embodiments, the first virtual character and the second virtual character may belong to the same camp, the same team, or the same organization, have a friend relationship with each other, or have a temporary communication permission. In some embodiments, the first virtual character and the second virtual character may belong to different camps, different teams, or different organizations, or have a hostile relationship with each other.

In some embodiments, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of the plurality of terminals. In this embodiment, the first terminal 110 and the second terminal 130 are merely used as an example for description. The device types of the first terminal 110 and the second terminal 130 are the same or different. The device types include at least a smartphone, a tablet computer, an e-book reader, an MP3 player, an MP4 player, a laptop portable computer, and a desktop computer.

FIG. 2 shows only two terminals. However, a plurality of other terminals 140 may access the server 120 in different embodiments. In some embodiments, one or more terminals 140 are terminals corresponding to a developer. A developing and editing platform for the client supporting a virtual environment is installed on terminal 140. The developer may edit and update the client on terminal 140 and transmit an updated client installation package to the server 120 by using a wired or wireless network. The first terminal 110 and the second terminal 130 may download the client installation package from server 120 to update the client.

The first terminal 110, the second terminal 130, and another terminal 140 are connected to the server 120 through a wireless network or a wired network.

The server 120 includes at least one of one server, a plurality of servers, a cloud computing platform, and a virtualization center. The server 120 is configured to provide a background service for a client supporting a virtual environment. In some embodiments, the server 120 is responsible for primary computing work, and the terminal is responsible for secondary computing work; or the server 120 is responsible for secondary computing work, and the terminal is responsible for primary computing work; or a distributed computing architecture is adopted between the server 120 and the terminal to perform collaborative computing.

In an exemplary example, the server 120 includes a processor 122, a user account database 123, a battle service module 124, and a user-oriented input/output (I/O) interface 125. The processor 122 is configured to load instructions stored in server 121, and process data in the user account database 123 and the battle service module 124. The user account database 123 is configured to store data of user accounts used by the first terminal 110, the second terminal 130, and another terminal 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 via a wireless network or a wired network for data exchange.

Figure 3:
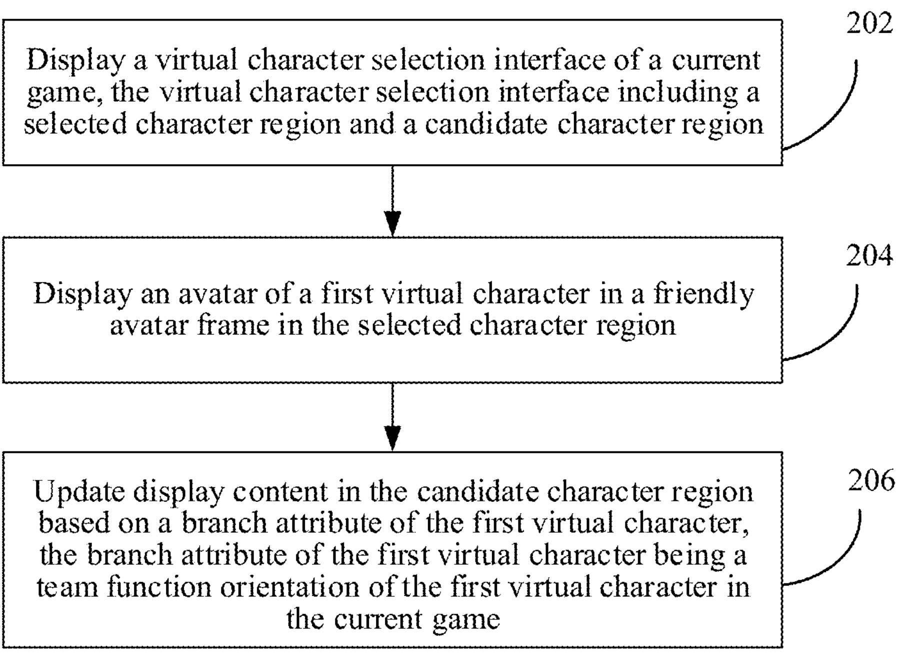
FIG. 3 is a flowchart of a method for displaying prompt information according to an embodiment of this application.

FIG. 3 is a flowchart of a method for displaying prompt information according to an embodiment of this application. This method can be performed by a terminal in the system as shown in FIG. 2 or a client on the terminal. The method includes:

Step 202: Display a virtual character selection interface of a current game, the virtual character selection interface including a selected character region and a candidate character region.

The virtual character selection interface is an interface for the user to select a virtual character used in the current game among a plurality of candidate virtual characters. "A plurality of" means two or more than two. The virtual character selection interface is generally displayed after a game is matched successfully and before the game starts. The virtual character selection interface includes a selected character region and a candidate character region. The candidate character region is located in the middle of the virtual character selection interface, and the selected character region is located on two sides of the virtual character selection interface.

The selected character region is used for displaying the virtual characters that have been selected. For example, the selected character region includes: a friendly selected character region and an enemy selected character region. The friendly selected character region is located on a left side of the virtual character selection interface, and the enemy selected character region is located on a right side of the virtual character selection interface. Take a 5V5 game as an example. The friendly selected character region is configured to display 4 friendly user accounts and the virtual characters selected by themselves, and the enemy selected character region is configured to display the virtual characters selected by 5 enemy user accounts.

The candidate character region is used for displaying the candidate virtual characters available for selection. In some embodiments, the candidate virtual characters available for selection include: all virtual characters; or the remaining virtual characters except the virtual characters selected by the friend; or the remaining virtual characters except the virtual characters selected by the friend and the enemy.

For example, in response to a first user account selecting a candidate virtual character in the candidate character region, an avatar of the candidate virtual character is displayed in an avatar frame corresponding to the first user account in the selected character region. The first user account is a user account currently logging in to a local client.

Step 204: Display an avatar of a first virtual character in a friendly avatar area in a selected character region.

The first virtual character is a virtual character selected by the friend. The avatar of the first virtual character is used for indicating the first virtual character selected by a friendly user account corresponding to the friendly avatar area. The avatar of the first virtual character in the friendly avatar area may be one or more. For example, the avatar of the corresponding first virtual character is displayed in one or more friendly avatar areas in the selected character region. This application is not limited.

For example, take a 5V5 game as an example. In response to a selection operation of the friendly user account on a first client, the avatar of the selected first virtual character is displayed in the selected character region on the first client. The first client sends synchronization information to the other nine clients through a server. In response to the synchronization information sent by the server, the avatar of the first virtual character is displayed in the friendly avatar area of the selected character region on the other four friendly clients. The four friendly clients include the local client. The avatar of the first virtual character is displayed in the enemy avatar frame in the enemy selected character region on five enemy clients. The selection operation may include at least one of a long press, click, double click, or slide, which is not limited in this application.

Figure 4:
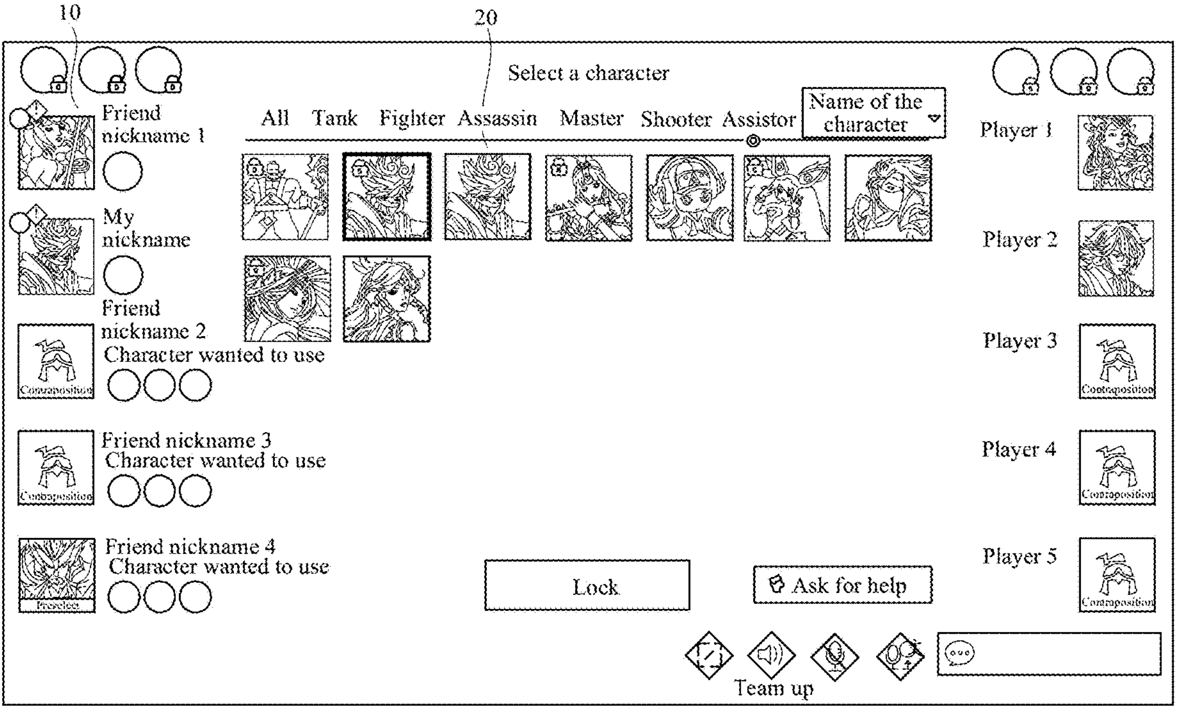
FIG. 4 is a schematic diagram of a virtual character selection interface according to an embodiment of this application.

For example, as shown in FIG. 4, a selected character region 10 and a candidate character region 20 are displayed on the virtual character selection interface. The first virtual character is a virtual character in the selected character region selected by the friend. The candidate character region 20 is used for displaying the virtual characters available for the user to select. In response to the virtual character selected by the first user account, the avatar of the candidate virtual character is displayed in the selected character region.

Step 206: Update display content in the candidate character region based on a branch attribute of the first virtual character. The branch attribute of the first virtual character may be a team function or certain category of tasks of the first virtual character in the current game. In the present disclosure, a branch attribute may also be referred to as a category indicator, which indicates the type of tasks or functions that may be executed by a virtual character.

The first virtual character has a first branch attribute, that is, the branch attribute of the first virtual character is the first branch attribute. The branch attribute is used for representing the team function of the virtual character in the current game. Each virtual character has a team function. For example, different virtual characters have different or the same branch attributes.

For example, the foregoing display content may include prompt content about the first branch attribute. The terminal displays the prompt content about the first branch attribute on the candidate character region. The prompt content is used for prompting that the branch attribute of the candidate virtual character is the same as or different from the first branch attribute. The prompt content may be in the form of text or pattern.

For example, the first branch attribute includes, but is not limited to: at least one of an upper route, a down route, a middle route, playing field, wandering, a developing route, and a confrontation route. Similarly, a category indicator may indicate tasks or functions associated with of an upper route, a down route, a middle route, playing field, wandering, a developing route, and a confrontation route. For example, in response to the first virtual character selected by the friend, the display content in the candidate character region changes according to the first branch attribute. That is, after the first virtual character is selected by the friend, the local terminal updates the display content in the candidate character region in response to the synchronization of the first virtual character being selected by the friend.

Accordingly, in the method provided in this embodiment, the terminal displays the virtual character selection interface of the current game. The virtual character selection interface is divided into a selected character region and a candidate character region. The avatar of the first virtual character selected by the friend is displayed in the friendly avatar area in the selected character region, and the avatar of a candidate virtual character is displayed in the candidate character region. Based on the first branch attribute, the display content in the candidate character region is updated. For example, the prompt content about the branch attribute of the first virtual character is displayed in the candidate character region, so that a user can timely check the branch attribute of the first virtual character selected by the friend when selecting the virtual character, and then select a virtual character to form a reasonable battle lineup with the virtual character selected by the friend, which avoids the occurrence of the user and teammates independently selecting the virtual character and finding that the lineup is unreasonable, and the subsequent adjustments needed improve the efficiency of human-computer interaction.

In some embodiments, the foregoing prompt content about the first branch attribute may include prompt information about the first branch attribute. The foregoing prompt information is displayed on an avatar frame of a second virtual character in the candidate character region. The foregoing prompt information is used for prompting that the branch attribute of the second virtual character is the same as or different from the branch attribute of the first virtual character.

It should be noted that, in this application, the prompt information displayed on the avatar frame refers to that the prompt information is displayed around the avatar frame. For example, the prompt information is displayed on the top, bottom, left, or right, or upper left, or lower left, or upper right, or lower right of the avatar frame.

For example, the display form of the prompt information includes, but is not limited to at least one of a bubble form, an animation form, and a special effect form.

For example, the foregoing prompt information about the first branch attribute includes any one of the following:

first prompt information, used for prompting that the branch attribute of the virtual character is the same as the first branch attribute; and second prompt information, used for prompting that the branch attribute of the virtual character is different from the first branch attribute.

For example, the first prompt information includes, but is not limited to at least one of an existing upper route, an existing down route, an existing middle route, existing playing field, existing wandering, an existing developing route, and an existing confrontation route. The second prompt information includes, but is not limited to at least one of an optional upper route, an optional down route, an optional middle route, optional playing field, optional wandering, an optional developing route, and an optional confrontation route.

For example, the foregoing prompt information is determined based on the branch attribute of one or more first virtual characters. For example, the first virtual character includes at least two, and the first prompt information corresponding to the second virtual character is displayed on the avatar frame of the second virtual character in response to the branch attribute of the second virtual character being the same as the branch attribute of any first virtual character; or the second prompt information corresponding to the second virtual character is displayed on the avatar frame of the second virtual character in response to the branch attribute of the second virtual character being different from the branch attributes of at least two first virtual characters.

For example, the second virtual character may include all candidate virtual characters. When the second virtual character includes all candidate virtual characters, the terminal displays the prompt information corresponding to each candidate virtual character. For example, the terminal displays the first prompt information around an avatar frame of a second virtual character, and displays the second prompt information around an avatar frame of another second virtual character.

Alternatively, the second virtual character may include a candidate virtual character with the first branch attribute. When the second virtual character includes a candidate virtual character with the first branch attribute, the terminal displays the first prompt information around the avatar frame of the second virtual character.

Alternatively, the second virtual character may include a candidate virtual character that does not have the first branch attribute. When the second virtual character includes a candidate virtual character that does not have the first branch attribute, the terminal displays the second prompt information around the avatar frame of the second virtual character.

Alternatively, the second virtual character may be a selected candidate virtual character. When the second virtual character is a selected candidate virtual character, the terminal displays the first prompt information or second prompt information around the avatar frame of the second virtual character.

As shown in the following embodiment, the foregoing situations of displaying the first prompt information and the second prompt information are described respectively.

Figure 5:
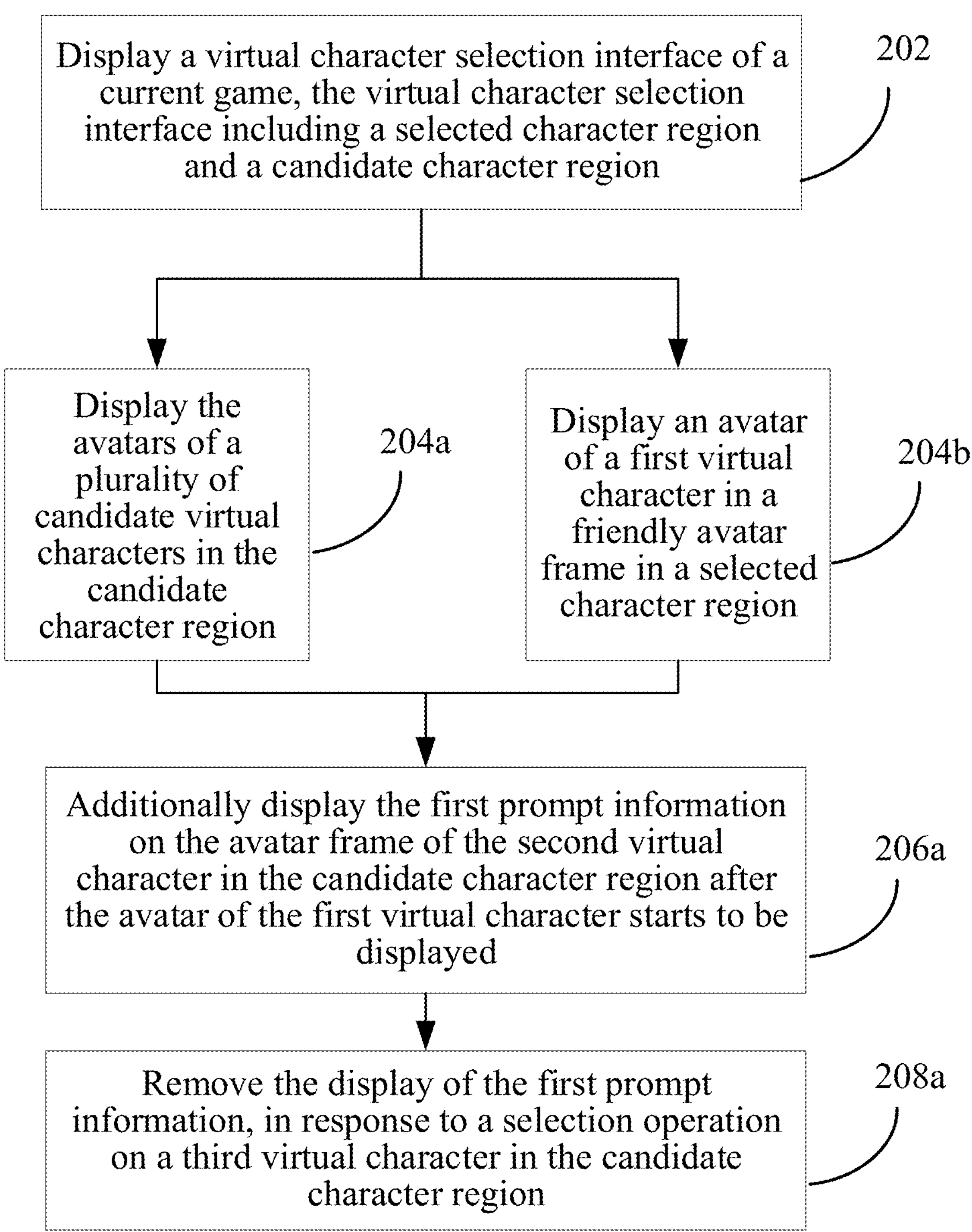
FIG. 5 is a flowchart of a method for displaying prompt information according to an embodiment of this application.

FIG. 5 is a flowchart of a method for displaying prompt information according to an embodiment of this application. This method can be performed by a terminal in the system as shown in FIG. 2 or a client on the terminal. The method includes:

Step 202: Display a virtual character selection interface of a current game, the virtual character selection interface including a selected character region and a candidate character region.

Step 204*a*: Display the avatars of a plurality of candidate virtual characters in the candidate character region.

For example, the plurality of candidate virtual characters includes a second virtual character and a third virtual character. The second virtual character has a second branch attribute, that is, the branch attribute of the second virtual character is the second branch attribute. The second branch attribute is used for representing the team function of the second virtual character in the current game. The second branch attribute is the same as the first branch attribute of the first virtual character.

It should be noted that step 204*a* and step 202 may be performed simultaneously, or step 204*a* may be performed after step 202.

Step 204*b*: Display an avatar of a first virtual character in a friendly avatar area in a selected character region.

The selected character region is used for displaying the virtual characters that have been selected. The virtual characters that have been selected may be the virtual characters selected by the friend or the virtual characters selected by the enemy. The avatar of the first virtual character is displayed in the friendly avatar area in the selected character region. The first virtual character in the selected character region may be one or more, that is, the avatar of the corresponding first virtual character is displayed in one or more friendly avatar areas, which is not limited in this application.

For example, take a 5V5 game as an example. In response to a selection operation of the friendly user account on a first client, the avatar of the selected first virtual character is displayed in the selected character region on the first client. The first client sends synchronization information to the other nine clients through a server. In response to the synchronization information sent by the server, the avatar of the first virtual character is displayed in the friendly avatar area of the selected character region on the other four friendly clients. The avatar of the first virtual character is displayed in the enemy avatar frame in the enemy selected character region on five enemy clients. The selection operation may include at least one of long press, click, double click, and slide, which is not limited in this application.

Step 206*a*: Additionally display the first prompt information on the avatar frame of the second virtual character in the candidate character region after the avatar of the first virtual character starts to be displayed.

In response to the first virtual character selected by the friend, the avatar of the first virtual character is displayed in the selected character region. For example, in response to the start of displaying the avatar of the first virtual character in the friendly avatar area, the first prompt information is displayed on the avatar frame of the second virtual character in the candidate character region 20. The first prompt information is used for prompting that the second branch attribute is the same as the first branch attribute.

Figure 6:
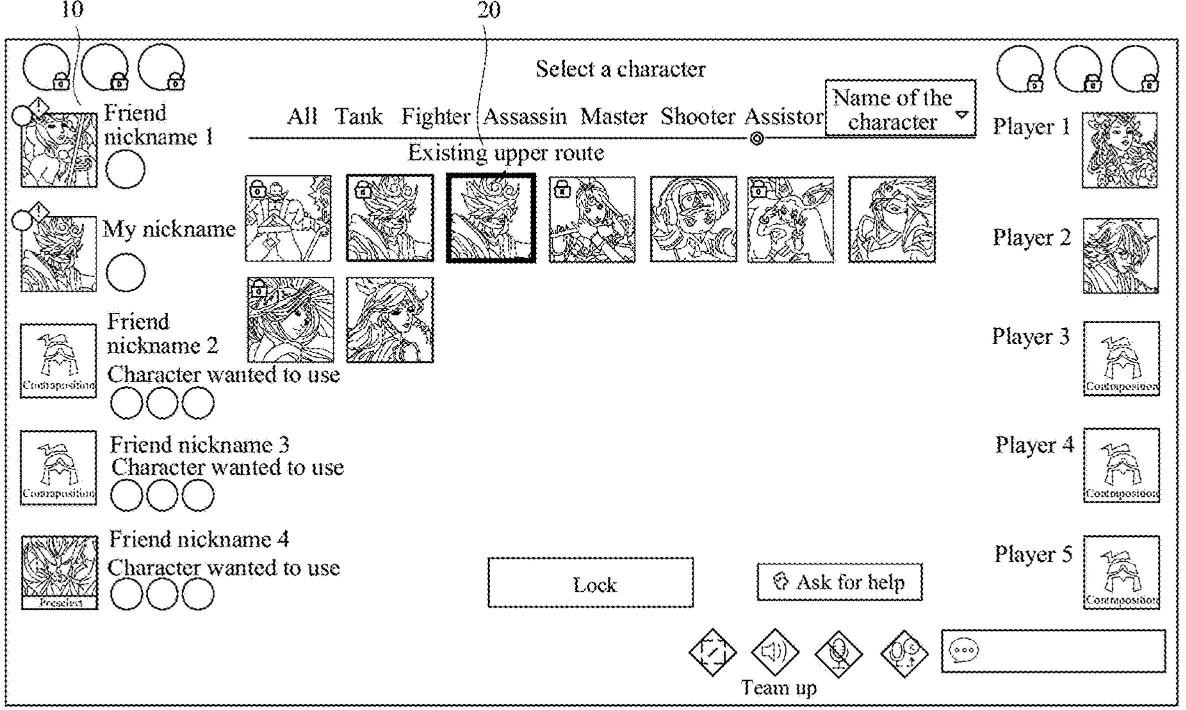
FIG. 6 is a schematic diagram of a virtual character selection interface according to an embodiment of this application.

For example, as shown in FIG. 6, the first branch attribute of the first virtual character selected by the friend is the upper route. After the avatar of the first virtual character is displayed on the avatar frame of the first virtual character in the selected character region 10, "the existing upper route" is displayed on the avatar frame of the second virtual character in the candidate character region 20.

Step 208*a*: Remove the display of the first prompt information, in response to a selection operation on a third virtual character in the candidate character region.

The avatars of a plurality of candidate virtual characters are displayed in the candidate character region, and the plurality of candidate virtual characters include the third virtual character. The third virtual character has a third branch attribute, that is, the branch attribute of the third virtual character is the third branch attribute. The third branch attribute is used for representing the team function of the third virtual character in the current game. The third branch attribute is different from the first branch attribute of the first virtual character.

According to the first prompt information on the avatar frame of the second virtual character in the candidate character region, the third virtual character is selected. The display of the first prompt information is removed, in response to a selection operation on the third virtual character in the candidate character region.

In conclusion, in the method provided in this embodiment, the terminal displays the virtual character selection interface of the current game. The avatars of a plurality of candidate virtual characters are displayed in the candidate character region. The plurality of candidate virtual characters includes a second virtual character and a third virtual character. After the avatar of the first virtual character is displayed in the friendly avatar area in the selected character region, the first prompt information is immediately additionally displayed on the avatar frame of the second virtual character in the candidate character region, to prompt the user that the branch attribute of the second virtual character is the same as the branch attribute of the first virtual character, so that the user can check the first branch attribute of the first virtual character selected by the friend, thereby making a timely judgment, reselecting a new virtual character, and adjusting the battle lineup.

Figure 7:
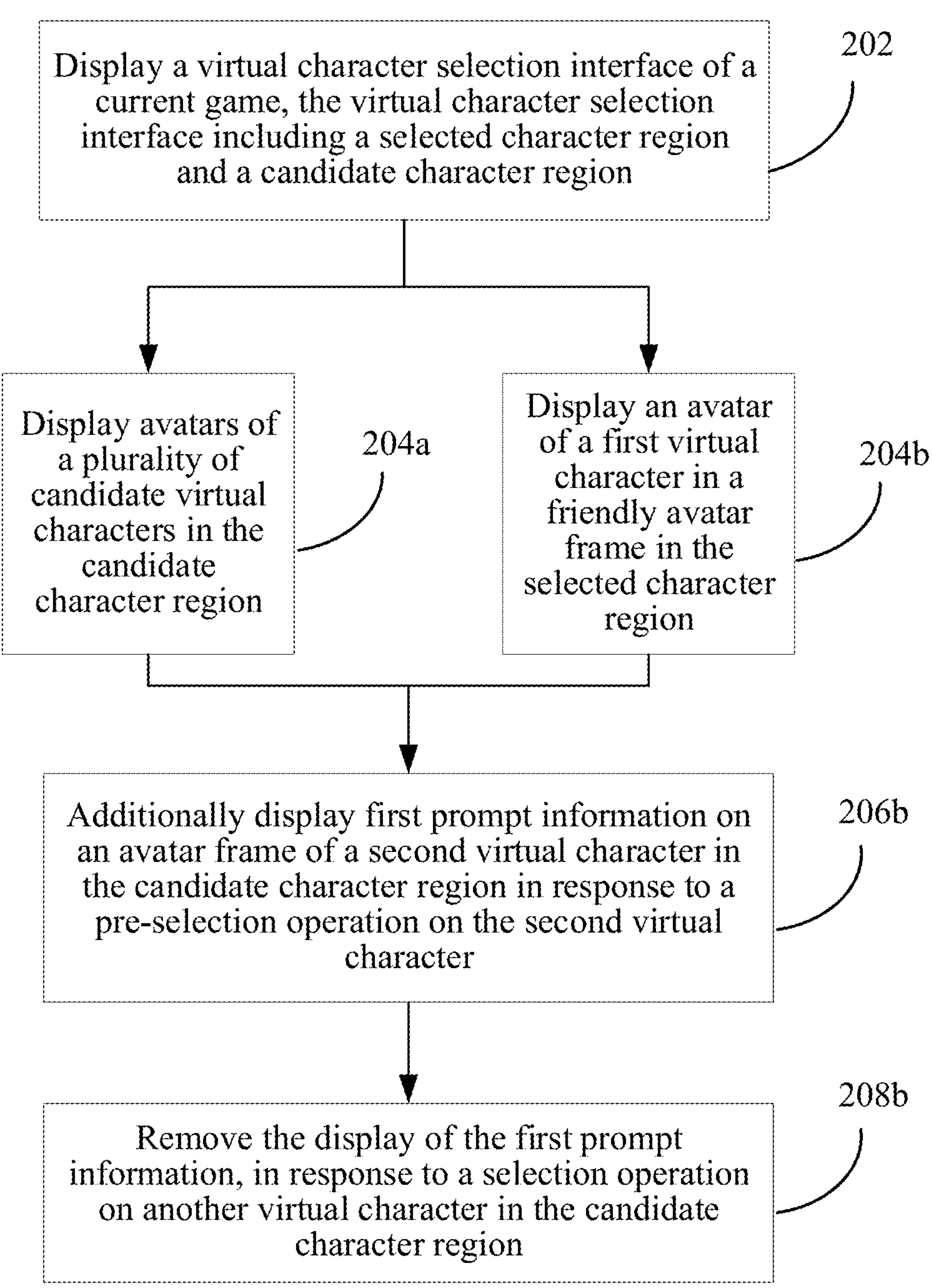
FIG. 7 is a flowchart of a method for displaying prompt information according to an embodiment of this application.

FIG. 7 is a flowchart of a method for displaying prompt information according to an embodiment of this application.

This method can be performed by a terminal in the system as shown in FIG. 2 or a client on the terminal. The method includes:

Step 202: Display a virtual character selection interface of a current game, the virtual character selection interface including a selected character region and a candidate character region.

Step 204*a*: Display the avatars of a plurality of candidate virtual characters in the candidate character region.

Step 204*b*: Display an avatar of a first virtual character in a friendly avatar area in a selected character region.

Step 206*b*: Additionally display the first prompt information on the avatar frame of the second virtual character in the candidate character region in response to a pre-selection operation on the second virtual character.

The pre-selection operation refers to clicking on the avatar of the virtual character, but not clicking lock, that is, the pre-selection operation can be performed on a plurality of virtual objects. For example, in response to the first virtual character selected by the friend, the avatar of the first virtual character is displayed in the selected character region. After the first virtual character is selected by the friend, the user selects the second virtual character in the candidate character region 20. In response to the pre-selection operation of the user on the second virtual character, the first prompt information is displayed on the avatar frame of the second virtual character. The first prompt information is used for prompting that the second branch attribute of the pre-selected second virtual character is the same as the first branch attribute of the first virtual character. The first prompt information includes, but is not limited to at least one of an existing upper route, an existing middle route, an existing down route, existing playing field, existing wandering, an existing developing route, and an existing confrontation route, which is not limited in this application. The form of the first prompt information includes, but is not limited to at least one of a bubble form, an animation form, and a special effect form, which is not limited in this application. The first prompt information may include one or more. For example, take two first virtual characters as examples. The first branch attribute of the two first virtual characters is the upper route and the down route respectively. In response to the pre-selection operation of the user on the second virtual character, the first prompt information is displayed on the avatar frame of the second virtual character whose second branch attribute is upper route or down route.

Figure 8:
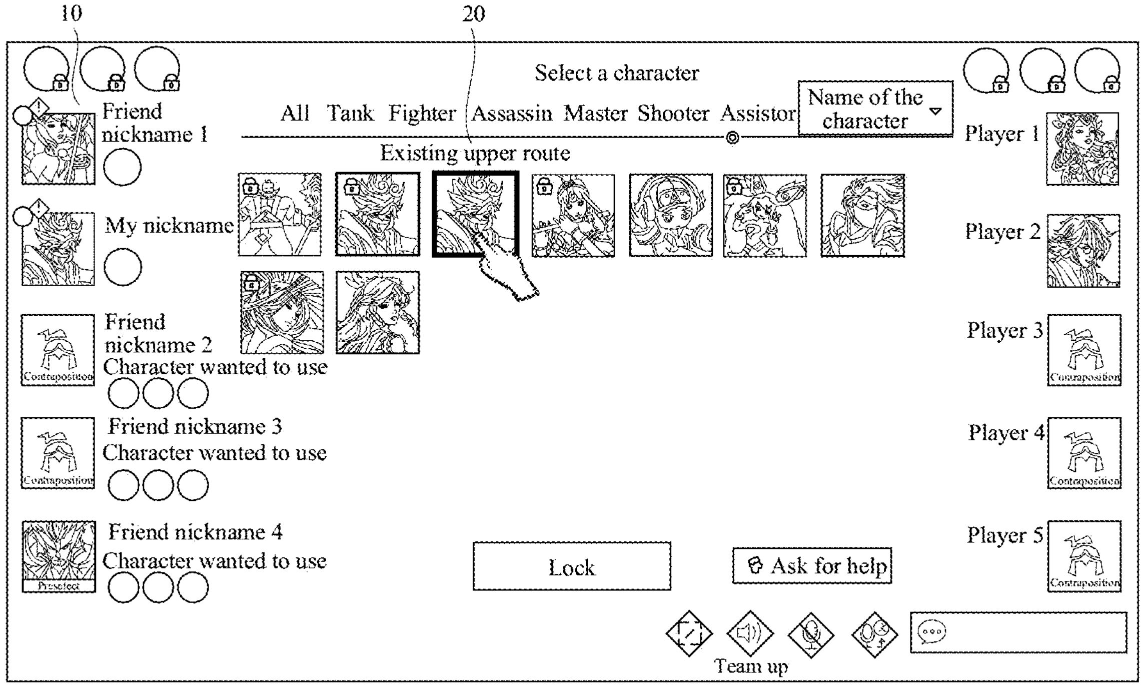
FIG. 8 is a schematic diagram of a virtual character selection interface according to an embodiment of this application.

For example, as shown in FIG. 8, the first branch attribute of the first virtual character selected by the friend is upper route. After the first virtual character is selected by the friend, the user selects the second virtual character in the candidate character region. In response to the pre-selection operation of the user on the second virtual character, and the branch attribute of the second virtual character being the upper route, the avatar frame of the pre-selected second virtual character in the candidate character region displays the existing upper route.

Step 208*b*: Remove the display of the first prompt information, in response to a selection operation on another virtual character in the candidate character region.

According to the first prompt information on the avatar frame of the preselected second virtual character in the candidate character region, another virtual character is selected. The display of the first prompt information is removed, in response to a selection operation on another virtual character in the candidate character region. Another virtual character includes one of the third virtual character or the next second virtual character.

For example, when the next second virtual character is selected, the terminal can also display the first prompt information around the avatar frame of the next second virtual character while removing the display of the first prompt information of the second virtual character.

In conclusion, in the method provided in this embodiment, through displaying the virtual character selection interface of the current game, the avatars of a plurality of candidate virtual characters are displayed in the candidate character region. The plurality of candidate virtual characters includes a second virtual character and a third virtual character. The avatar of the first virtual character is displayed in the friendly avatar area in the selected character region. When the user selects the second virtual character, in response to the pre-selection operation of the user on the second virtual character, the first prompt information is additionally displayed on the avatar frame of the second virtual character in the candidate character region. According to the first prompt information on the avatar frame of the second virtual character, the user can timely check the first branch attribute of the first virtual character selected by the friend, and select a next virtual character, which avoids interference, and can quickly determine the first branch attribute of the first virtual character selected by the friend.

Figure 9:
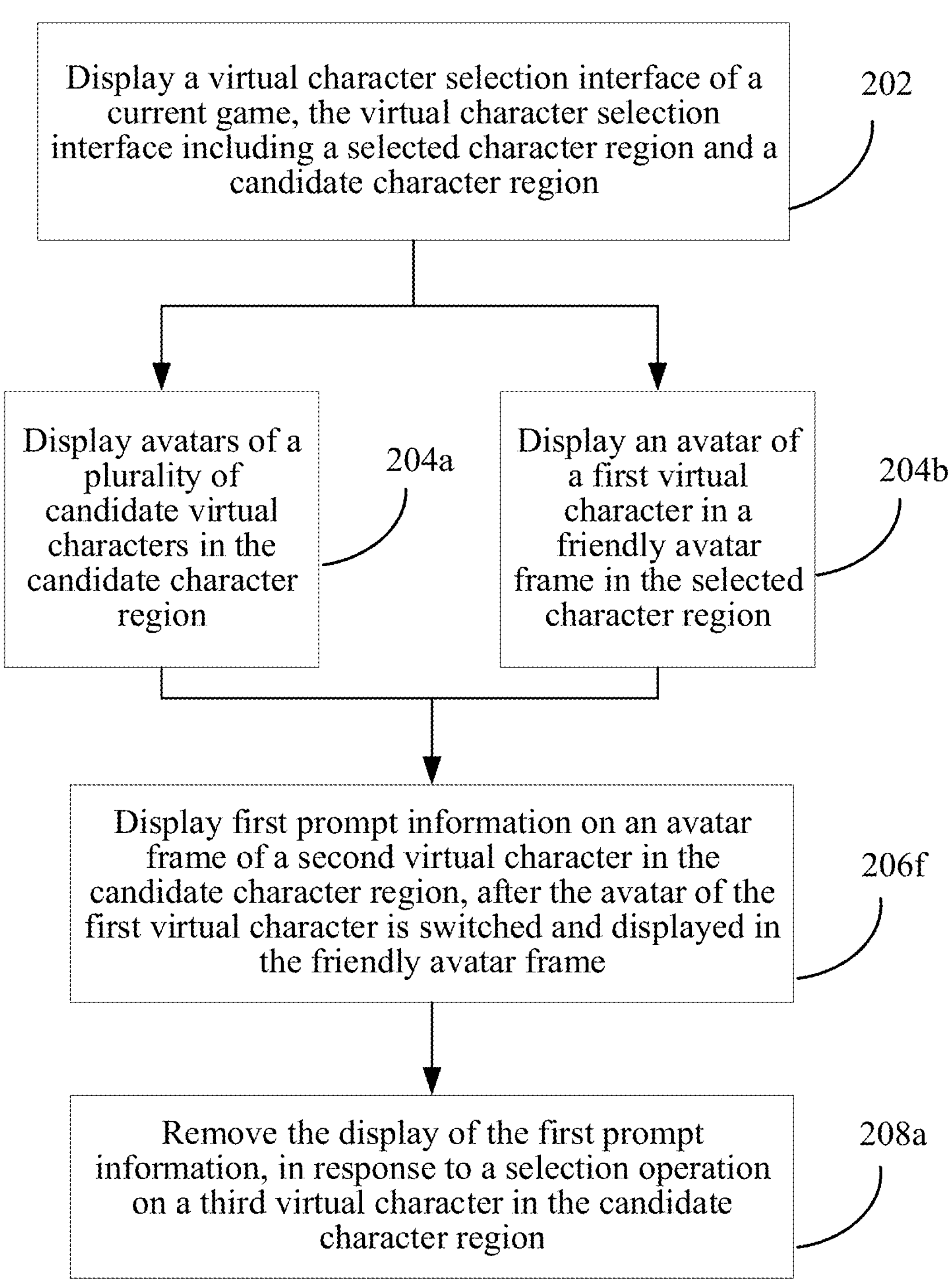
FIG. 9 is a flowchart of a method for displaying prompt information according to an embodiment of this application.

FIG. 9 is a flowchart of a method for displaying prompt information according to an embodiment of this application. This method can be performed by a terminal in the system as shown in FIG. 2 or a client on the terminal. The method includes:

Step 202: Display a virtual character selection interface of a current game, the virtual character selection interface including a selected character region and a candidate character region.

Step 204*a*: Display the avatars of a plurality of candidate virtual characters in the candidate character region.

Step 204*b*: Display an avatar of a first virtual character in a friendly avatar area in a selected character region.

Step 206*f*: Display the first prompt information on the avatar frame of the second virtual character in the candidate character region, after the avatar of the first virtual character is switched and displayed in the friendly avatar area.

The avatar of the first virtual character in the friendly avatar area is switched and displayed as the friendly user account reselects the virtual character.

After the avatar of the first virtual character is switched and displayed in the friendly avatar area, the first prompt information is additionally displayed around the avatar frame of the second virtual character, or the first prompt information continues to be displayed around the avatar frame of the second virtual character. For example, when the avatar of the last first virtual character is displayed in the friendly avatar area, the first prompt information is displayed above the avatar frame of a virtual character 1. After the avatar of the first virtual character is switched and displayed, in response to the branch attribute of the first virtual character being the same as the branch attribute of the last first virtual character, the first prompt information continues to be displayed around the avatar frame of a virtual character 1. In another example, when the avatar of the last first virtual character is displayed in the friendly avatar area, the branch attribute of a virtual character 2 is different from the branch attribute of the last first virtual character, and the first prompt information is not displayed around the avatar frame of the virtual character 2. After the avatar of the first virtual character is switched and displayed, in response to the branch attribute of the first virtual character being different form the branch attribute of the last first virtual character, the first prompt information is additionally displayed around the avatar frame of the virtual character 2.

Step 208*a*: Remove the display of the first prompt information, in response to a selection operation on a third virtual character in the candidate character region.

In conclusion, in the method provided in this embodiment, the terminal displays the virtual character selection interface of the current game. The avatars of a plurality of candidate virtual characters are displayed in the candidate character region. The plurality of candidate virtual characters includes a second virtual character and a third virtual character. After the avatar of the first virtual character is switched and displayed in the friendly avatar area in the selected character region, the first prompt information is additionally displayed or continues to be displayed on the avatar frame of the second virtual character in the candidate character region, to prompt the user that the branch attribute of the second virtual character is the same as the branch attribute of the first virtual character, so that the user can timely check the first branch attribute of the first virtual character selected by the friend, thereby making a timely judgment, reselecting a new virtual character, and adjusting the battle lineup.

Figure 10:
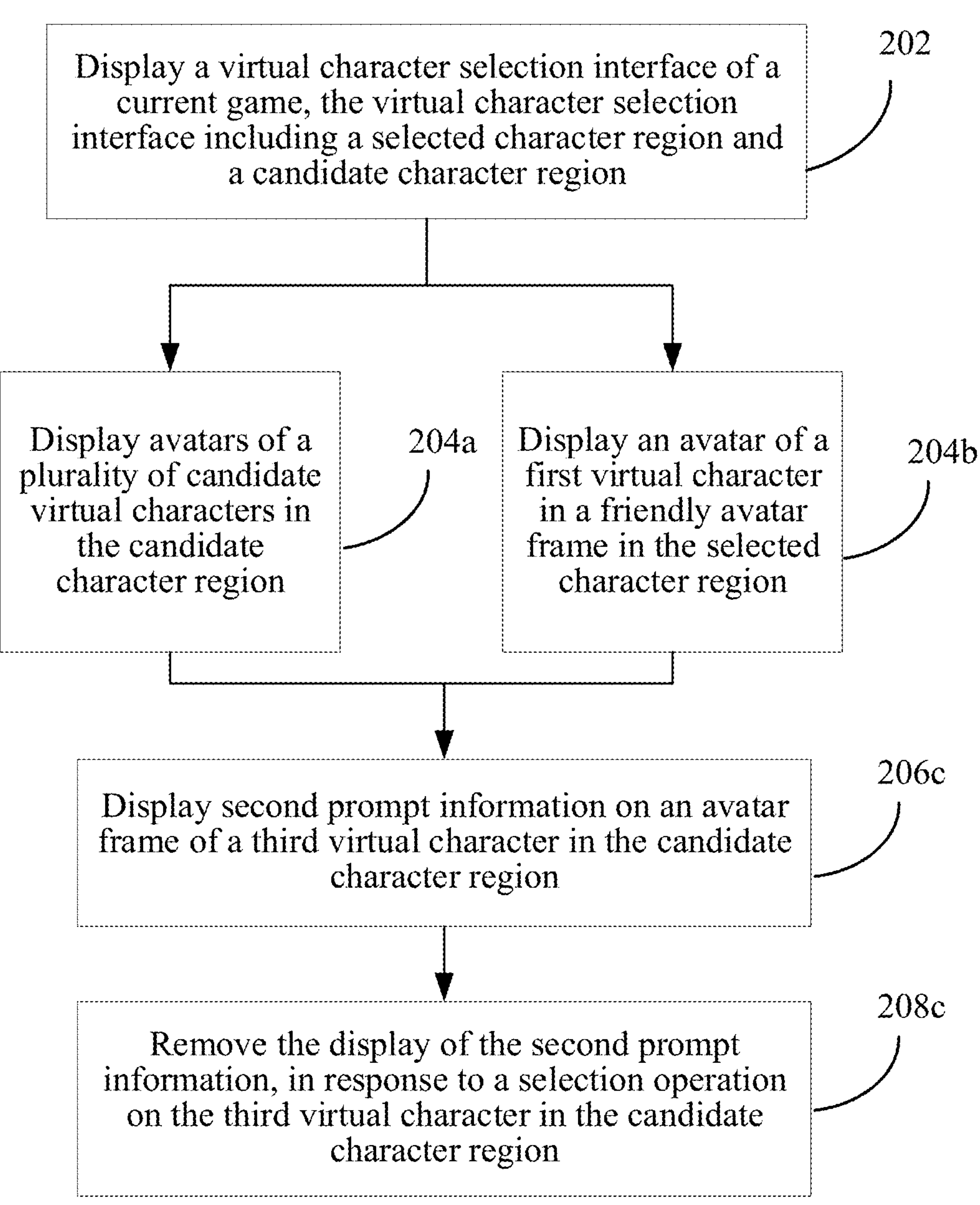
FIG. 10 is a flowchart of a method for displaying prompt information according to an embodiment of this application.

FIG. 10 is a flowchart of a method for displaying prompt information according to an embodiment of this application. This method can be performed by a terminal in the system as shown in FIG. 2 or a client on the terminal. The method includes:

Step 202: Display a virtual character selection interface of a current game, the virtual character selection interface including a selected character region and a candidate character region.

Step 204*a*: Display the avatars of a plurality of candidate virtual characters in the candidate character region.

Step 204*b*: Display an avatar of a first virtual character in a friendly avatar area in a selected character region.

Step 206*c*: Display second prompt information on an avatar frame of a third virtual character in the candidate character region.

The second prompt information is used for prompting that the third branch attribute of the third virtual character is different from the first branch attribute of the first virtual character. For example, the second prompt information includes, but is not limited to at least one of an optional upper route, an optional down route, an optional middle route, optional playing field, optional wandering, an optional developing route, and an optional confrontation route, which is not limited in this application.

In some embodiments, the second prompt information is additionally displayed on the avatar frame of the third virtual character in the candidate character region after the avatar of the first virtual character starts to be displayed.

For example, after the avatar of the first virtual character selected by the friend starts to be displayed in the friendly avatar area. In response to the avatar of the first virtual character starting to be displayed in the friendly avatar area, the second prompt information is displayed in the avatar frame of the third virtual character in the candidate character region 20.

In some embodiments, the second prompt information is additionally displayed on the avatar frame of the third virtual character in the candidate character region in response to a pre-selection operation on the third virtual character.

For example, in response to the first virtual character selected by the friend, the avatar of the first virtual character is displayed in the selected character region. After the first virtual character is selected by the friend, the user selects the third virtual character in the candidate character region 20. In response to the pre-selection operation of the user on the third virtual character, the second prompt information is displayed on the avatar frame of the third virtual character in the candidate character region 20.

In some embodiments, the second prompt information is displayed on the avatar frame of the third virtual character in the candidate character region, after the avatar of the first virtual character is switched and displayed in the friendly avatar area.

The avatar of the first virtual character in the friendly avatar area is switched and displayed as the friendly user account reselects the virtual character. After the avatar of the first virtual character is switched and displayed in the friendly avatar area, the second prompt information is additionally displayed around the avatar frame of the third virtual character, or the second prompt information continues to be displayed around the avatar frame of the third virtual character. For example, when the avatar of the last first virtual character is displayed in the friendly avatar area, the second prompt information is displayed above the avatar frame of a virtual character 3. After the avatar of the first virtual character is switched and displayed, in response to the branch attribute of the first virtual character being the same as the branch attribute of the last first virtual character, the second prompt information continues to be displayed around the avatar frame of the virtual character 3. In another example, when the avatar of the last first virtual character is displayed in the friendly avatar area, the branch attribute of a virtual character 4 is the same as the branch attribute of the last first virtual character, and the second prompt information is not displayed around the avatar frame of the virtual character 4. After the avatar of the first virtual character is switched and displayed, in response to the branch attribute of the first virtual character being different form the branch attribute of the last first virtual character, the second prompt information is additionally displayed around the avatar frame of the virtual character 4.

Step 208*c*: Remove the display of the second prompt information, in response to a selection operation on a third virtual character in the candidate character region.

In response to the selection operation on the third virtual character in the candidate character region, the display of the second prompt information is removed. After the third virtual character is selected, the second prompt information on the avatar frame of the third virtual character is removed.

Figure 11:
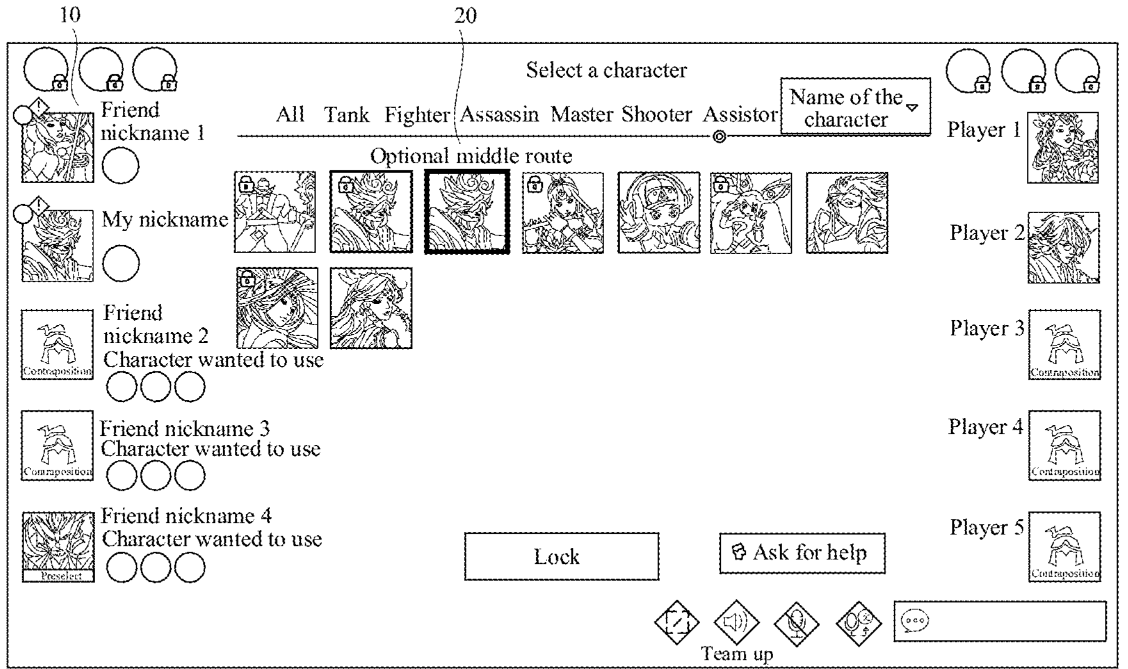
FIG. 11 is a schematic diagram of a virtual character selection interface according to an embodiment of this application.

For example, as shown in FIG. 11, the first branch attribute of the first virtual character selected by the friend is upper route. After the first virtual character is selected by the friend, in response to the avatar of the first virtual character starting to be displayed in the friendly avatar area or the optional middle route being displayed on the avatar frame of the third virtual character in the candidate character region, the user is prompted that the third branch attribute of the virtual character is middle route, which is different from the first branch attribute.

For example, as shown in FIG. 11, the first branch attribute of the first virtual character selected by the friend is upper route, and the user selects the third virtual character in the candidate character region. In response to the selection operation of the user on the third virtual character, the optional middle route is displayed on the avatar frame of the third virtual character in the candidate character region, and the user is prompted that the third branch attribute of the virtual character is middle route, which is different from the first branch attribute.

In conclusion, in the method provided in this embodiment, through displaying the virtual character selection interface of the current game, the avatars of a plurality of candidate virtual characters are displayed in the candidate character region. The plurality of candidate virtual characters includes a second virtual character and a third virtual character. The avatar of the first virtual character is displayed in the friendly avatar area in the selected character region, after the avatar of the first virtual character starts be displayed in the friendly avatar area or when the user selects the third virtual character, in response to the avatar of the first virtual character starting to be displayed in the friendly avatar area or in response to the selection operation on the third virtual character in the candidate character region 20, the second prompt information is additionally displayed on the avatar frame of the third virtual character in the candidate character region 20, so that the user can select the virtual character directly and quickly according to suggestions in the second prompt information on the avatar frame of the third virtual character, so as to improve the efficiency of human-computer interaction.

Figure 12:
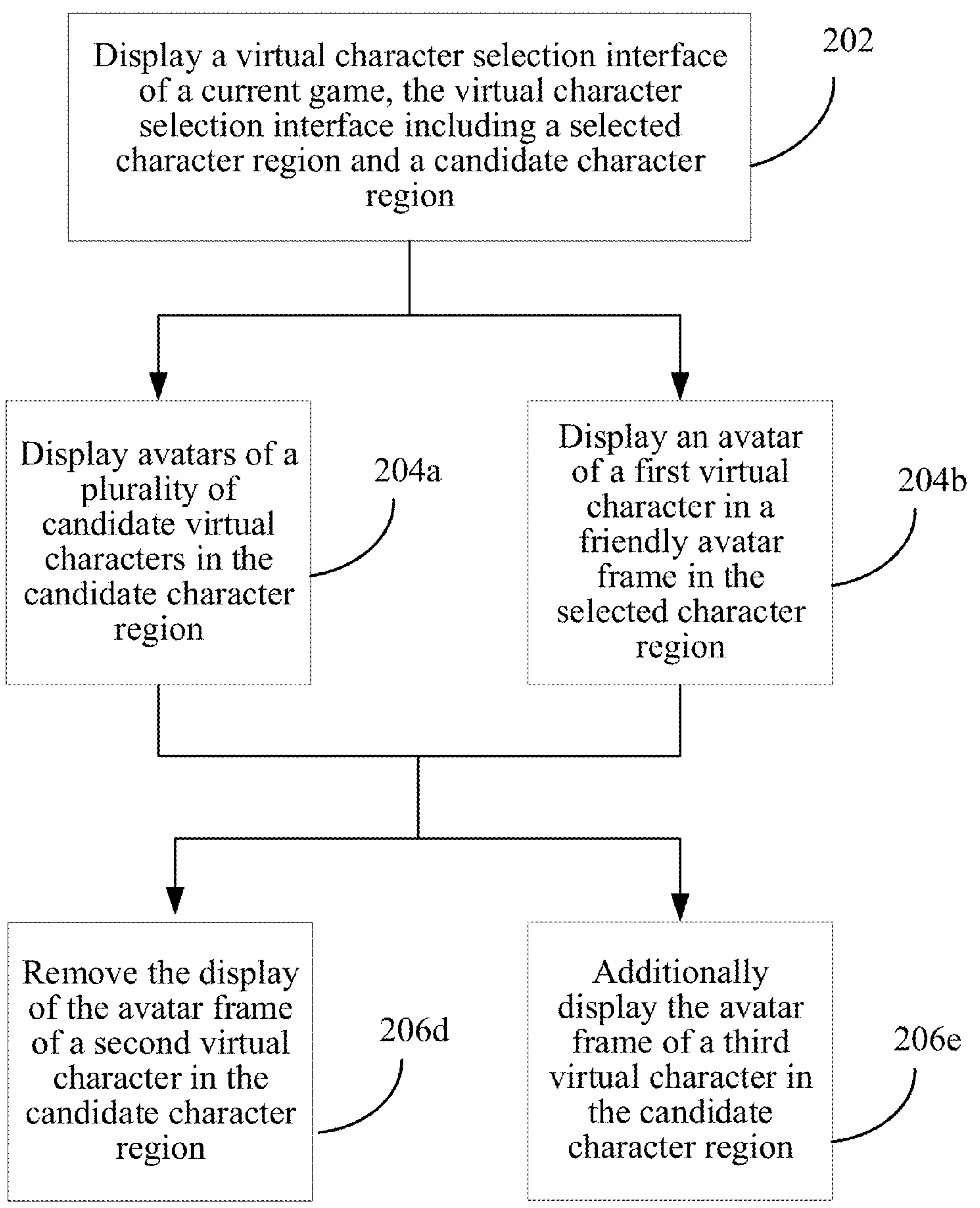
FIG. 12 is a flowchart of a method for displaying prompt information according to an embodiment of this application.

FIG. 12 is a flowchart of a method for displaying prompt information according to an embodiment of this application. This method can be performed by a terminal in the system as shown in FIG. 2 or a client on the terminal. The method includes:

Step 202: Display a virtual character selection interface of a current game, the virtual character selection interface including a selected character region and a candidate character region.

Step 204*a*: Display the avatars of a plurality of candidate virtual characters in the candidate character region.

Step 204*b*: Display an avatar of a first virtual character in a friendly avatar area in a selected character region.

Step 206*d*: Remove the display of the avatar frame of the second virtual character in the candidate character region.

For example, after the avatar of the first virtual character selected by the friend starts to be displayed in the friendly avatar area. In response to the avatar of the first virtual character starting to be displayed in the friendly avatar area, the avatar frame of the second virtual character corresponding to the second branch attribute that is the same as the first branch attribute is removed in the candidate character region 20.

Alternatively, in response to the first virtual character selected by the friend, the avatar of the first virtual character is displayed in the selected character region. After the first virtual character is selected by the friend, the user selects any virtual character in the candidate character region 20. In response to the pre-selection operation of the user on any virtual character, the display of the avatar frame of the second virtual character is removed in the candidate character region 20. The second branch attribute of the second virtual character is the same as the first branch attribute. In response to the display of the avatar frame of the second virtual character being removed, only the candidate virtual character with different first branch attribute from the first virtual character is displayed in the candidate character region 20.

Step 206*e*: Additionally display the avatar frame of the third virtual character in the candidate character region.

For example, after the avatar of the first virtual character selected by the friend starts to be displayed in the friendly avatar area. In response to the avatar of the first virtual character starting to be displayed in the friendly avatar area, the avatar frame of the third virtual character is additionally displayed in the candidate character region 20.

Alternatively, in response to the first virtual character selected by the friend, the avatar of the first virtual character is displayed in the selected character region. After the first virtual character is selected by the friend, the user selects any virtual character in the candidate character region 20. In response to the pre-selection operation of the user on any virtual character, the avatar frame of the third virtual character is additionally displayed in the candidate character region 20. In the foregoing two conditions, the third branch attribute of the third virtual character is different from the first branch attribute of the first virtual character.

It should be noted that the execution sequence of step 206*d* and step 206*e* may be parallel, or step 206*d* is executed after step 206*e*, or step 206*d* is executed before step 206*e*.

Figure 13:
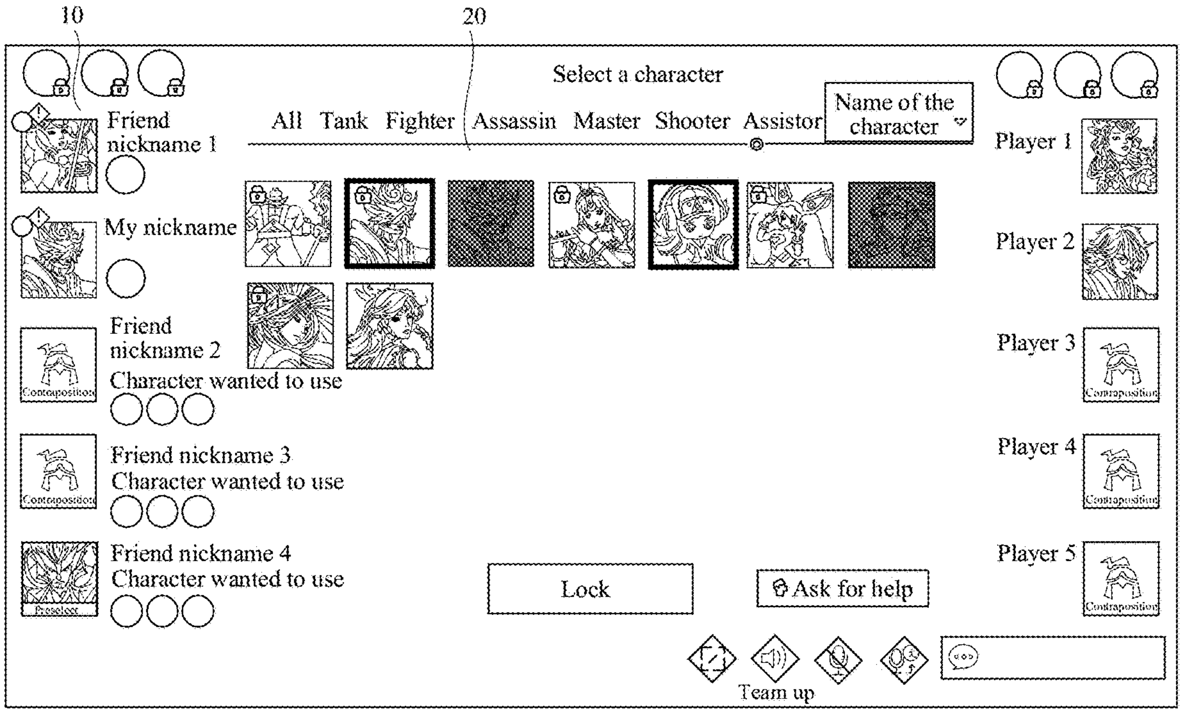
FIG. 13 is a schematic diagram of a virtual character selection interface according to an embodiment of this application.

For example, as shown in FIG. 13, in response to the avatar of the first virtual character starting to be displayed in the friendly avatar area, or in response to the pre-selection of the user on any virtual character, the display of the avatar frame of the second virtual character is removed in the candidate character region 20. The removal of display includes, but is not limited to one or more of non-display and shadow coverage. This application does not limit this. This embodiment takes shadow as an example.

For example, as shown in FIG. 13, in response to the avatar of the first virtual character starting to be displayed in the friendly avatar area, or in response to the pre-selection of the user on any virtual character, the avatar frame of the third virtual character is additionally displayed in the candidate character region 20. The avatar frame of the third virtual character is additionally displayed, which includes but is not limited to one or more of a bold avatar frame and a highlighted avatar frame. This application does not limit this. This embodiment takes the bold avatar frame as an example.

For example, as shown in FIG. 13, in response to the avatar of the first virtual character starting to be displayed in the friendly avatar area, or in response to the pre-selection of the user on any virtual character, the display of the avatar frame of the second virtual character is removed in the candidate character region 20, and at the same time, the avatar frame of the third virtual character is additionally displayed in the candidate character region 20.

In conclusion, in the method provided in this embodiment, through displaying the virtual character selection interface of the current game, in response to the selection operation of the friend, the avatars of a plurality of candidate virtual characters are displayed in the candidate character region, and the plurality of candidate virtual characters include the second virtual character and the third virtual character. In response to the avatar of the first virtual character starting to be displayed in the friendly avatar area, or in response to the selection operation of the user on any virtual character in the candidate character region 20, the display of the avatar frame of the second virtual character is removed in the candidate character region. Additionally, the avatar frame of the third virtual character is additionally displayed in the candidate character region 20. Additionally, the display of the avatar frame of the second virtual character is removed and the avatar frame of the third virtual character is additionally displayed in the candidate character region 20 at the same time. According to the change prompt of the avatar frame of the candidate virtual character in the candidate character region 20, the user can timely check the first branch attribute corresponding to the first virtual character selected by the friend, and select a virtual character that is different from the first branch attribute selected by the friend, so as to improve the efficiency of human-computer interaction.

Figure 14:
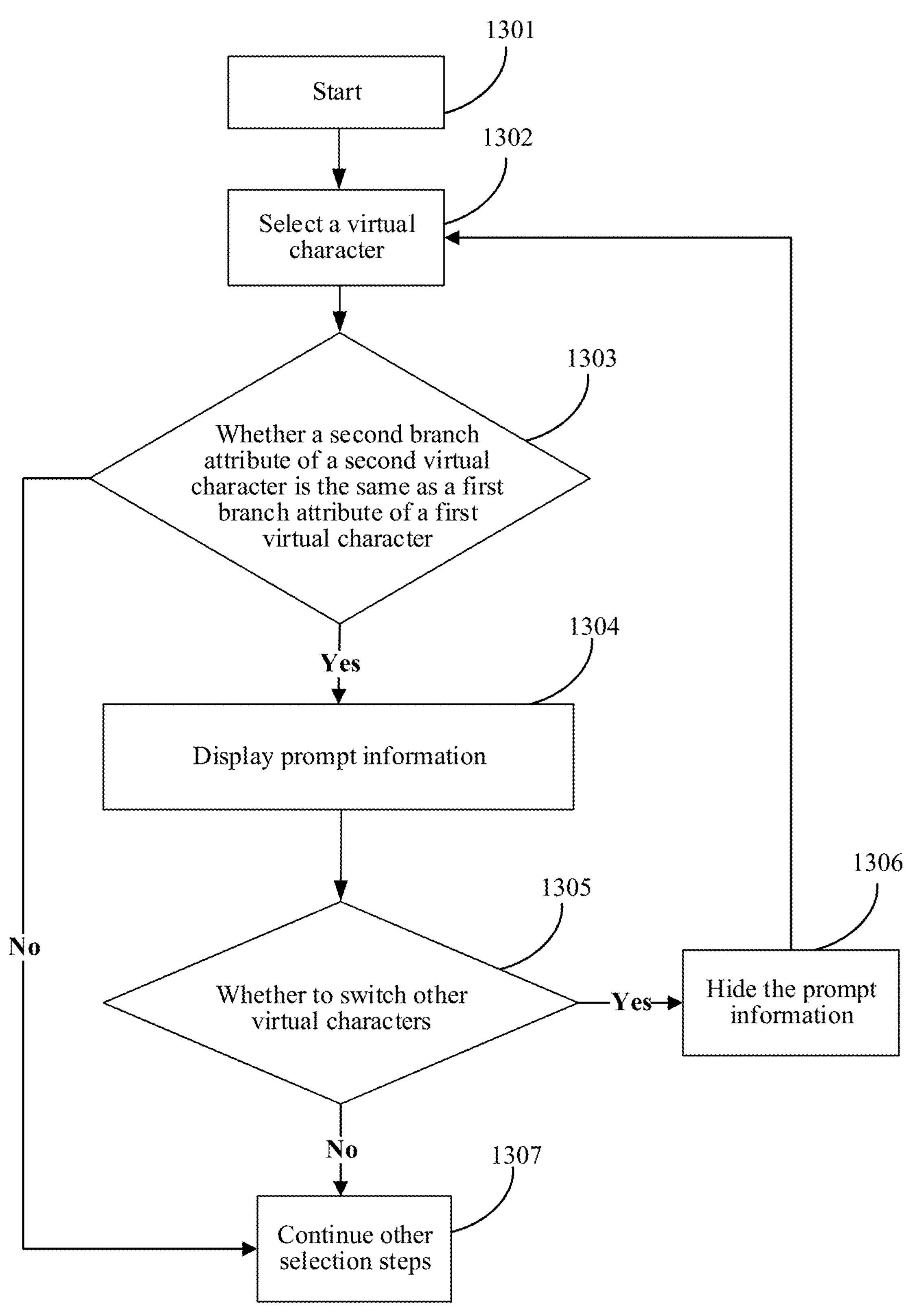
FIG. 14 is a flowchart of a method for selecting a virtual character according to an embodiment of this application.

FIG. 14 is a flowchart of a method for selecting a virtual character according to an embodiment of this application. This method can be performed by a terminal in the system as shown in FIG. 2 or a client on the terminal. The method includes:

Step 1301: Start.

Step 1302: Select a virtual character.

A client displays a virtual character selection interface of a current game, the virtual character selection interface including a selected character region 10 and a candidate character region 20. The selected character region is used for displaying the virtual characters that have been selected. The candidate character region is used for displaying the candidate virtual characters available for selection. For example, in response to a first user account selecting a candidate virtual character in the candidate character region, an avatar of the candidate virtual character is displayed in an avatar frame corresponding to the first user account in the selected character region.

The user selects the virtual character by clicking or pressing the avatar of the corresponding virtual character on the client. The user can also select the virtual character through a signal generated by long press, click, double click and/or slide on a touch screen.

Step 1303: Whether the second branch attribute of the second virtual character is the same as the first branch attribute of the first virtual character.

The first virtual character is used for indicating a virtual character selected by the friend, and has a first branch attribute. The second virtual character is one or more candidate virtual characters available for selection in the candidate character region. The second virtual character has a second branch attribute.

For example, when the second branch attribute of the second virtual character selected by the user is the same as the first branch attribute of the first virtual character selected by the friend, perform step 1304; and when the second branch attribute of the second virtual character selected by the user is different from the first branch attribute of the first virtual character selected by the friend, perform step 1307.

Step 1304: Display prompt information.

For example, when the second branch attribute of the second virtual character selected by the user is the same as the first branch attribute of the first virtual character selected by the friend, the prompt information is displayed on the virtual character selection interface of the current game to prompt the user to check the first branch attribute of the first virtual character selected by the friend.

Step 1305: Whether to switch to other virtual characters.

For example, when the second branch attribute of the second virtual character selected by the user is the same as the first branch attribute of the first virtual character selected by the friend, if the user selects to switch to other virtual characters, perform step 1306, and if no other virtual character is selected, perform step 1307.

Step 1306: Hide the prompt information.

For example, the second branch attribute of the second virtual character selected by the user is the same as the first branch attribute of the first virtual character selected by the friend. When the user selects to switch to another virtual character, the prompt information is hidden on the virtual character selection interface, and a new round of judgment is made on whether the branch attribute of the virtual character is the same as the first branch attribute of the first virtual character selected by the friend.

Step 1307: Continue other selection steps.

For example, when the second branch attribute of the second virtual character selected by the user is different from the first branch attribute of the first virtual character selected by the friend, or the second branch attribute of the second virtual character selected by the user is the same as the first branch attribute of the first virtual character selected by the friend, but still willing to select the virtual character, then the virtual character is selected as the virtual character used this time, and other selection steps are continued.

In conclusion, in the method provided in this embodiment, in response to the selection operation on the client, the virtual character selection interface displays a selected character region and a candidate character region. Based on the first branch attribute of the first virtual character in the selected character region, whether the second branch attribute of the second virtual character is the same as the first branch attribute of the first virtual character is determined. When the second branch attribute of the second virtual character is the same as the first branch attribute of the first virtual character, the prompt information is displayed to prompt the user to check the first branch attribute of the first virtual character selected by the friend. According to the prompt information about the first branch attribute of the first virtual character selected by the friend, the user is helped to decide to continue using the second virtual character or reselect a new virtual character.

Figure 15:
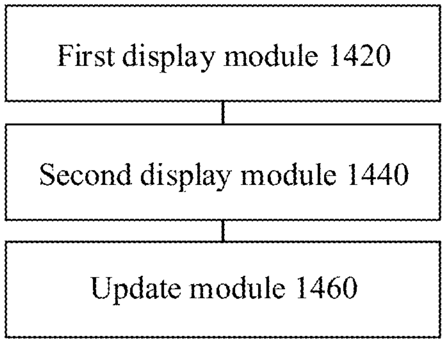
FIG. 15 is a block diagram of an apparatus for displaying prompt information according to an embodiment of this application.

FIG. 15 is a schematic structural diagram of an apparatus for displaying prompt information according to an embodiment of this application. The apparatus may be implemented as an entire computer device or a part of the computer device by using software, hardware, or a combination thereof. The apparatus includes:

- a first display module 1420, configured to display a virtual character selection interface of a current game;
- a second display module 1440, configured to display an avatar of a first virtual character in a friendly avatar area in the selected character region, the avatar of the first virtual character being used for indicating the first virtual character selected by a friendly user account corresponding to the friendly avatar area; and
- an update module 1460, configured to update display content in the candidate character region based on a branch attribute of the first virtual character, the branch attribute of the first virtual character being a team function of the first virtual character in the current game.

In this embodiment, the update module 1460 is configured to display prompt information on an avatar frame of a second virtual character in the candidate character region, the prompt information being used for prompting that a branch attribute of the second virtual character is the same as or different from the branch attribute of the first virtual character.

In this embodiment, the update module 1460 is configured to display first prompt information on the avatar frame of the second virtual character in the candidate character region, the first prompt information being used for prompting that the branch attribute of the second virtual character is the same as the branch attribute of the first virtual character.

In this embodiment, the update module 1460 is configured to:

- additionally display the first prompt information on the avatar frame of the second virtual character in the candidate character region after the avatar of the first virtual character starts to be displayed;

or display the first prompt information on the avatar frame of the second virtual character in the candidate character region, after the avatar of the first virtual character is switched and displayed in the friendly avatar area;

or additionally display the first prompt information on the avatar frame of the second virtual character in the candidate character region in response to a pre-selection operation on the second virtual character.

In this embodiment, the update module 1460 is configured to remove the display of the first prompt information, in response to a selection operation on a third virtual character in the candidate character region, where a branch attribute of the third virtual character is different from the branch attribute of the first virtual character.

In one embodiment, the update module 1460 is configured to display second prompt information on the avatar frame of the third virtual character in the candidate character region, the second prompt information being used for prompting that the branch attribute of the third virtual character is different from the branch attribute of the first virtual character.

In this embodiment, the update module 1460 is configured to remove, in the candidate character region, display of an avatar frame of a second virtual character, a branch attribute of the second virtual character being the same as the branch attribute of the first virtual character.

In this embodiment, the update module 1460 is configured to additionally display, in the candidate character region, an avatar frame of a third virtual character, a branch attribute of the third virtual character being different from the branch attribute of the first virtual character.

Figure 16:
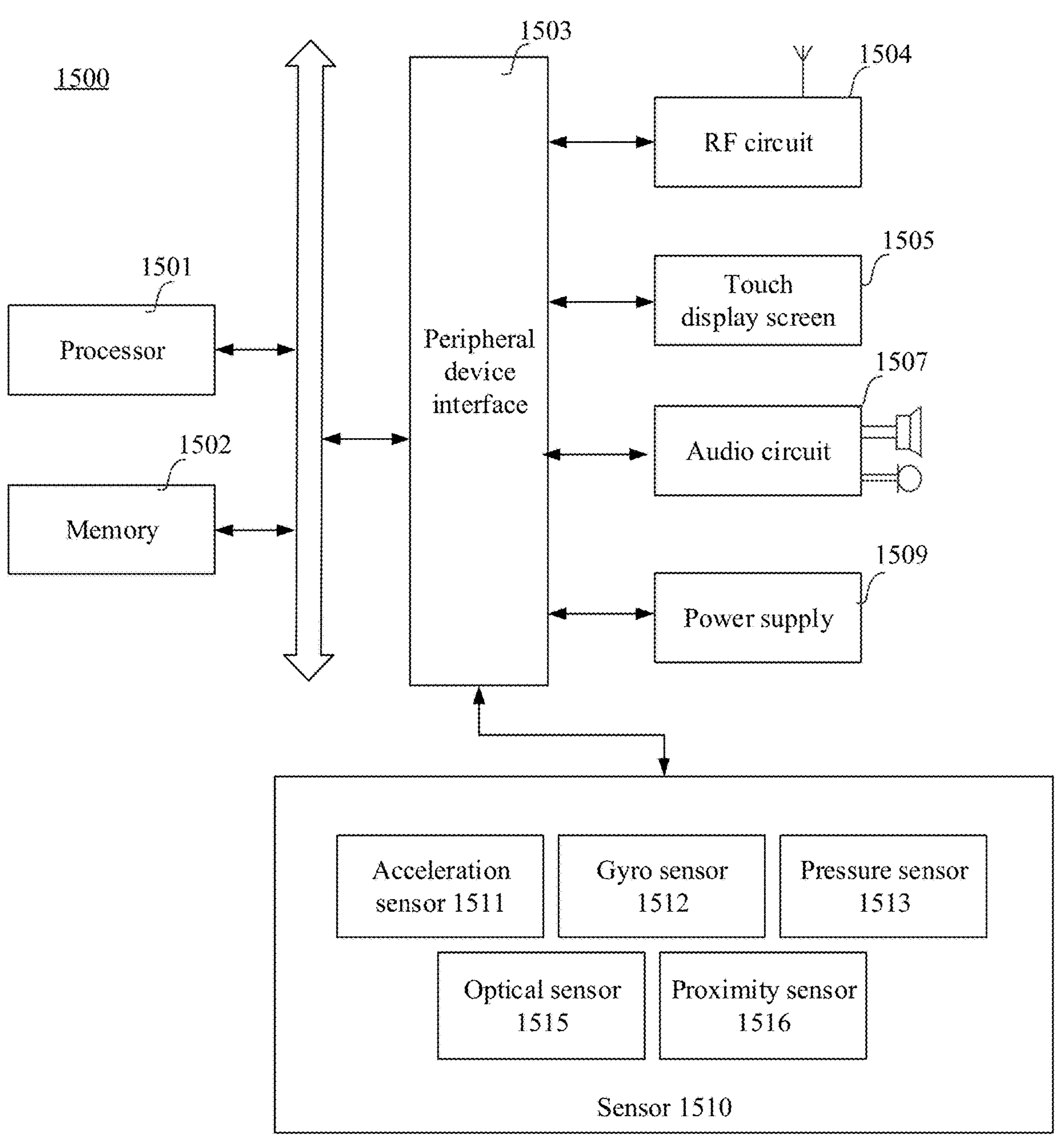
FIG. 16 is a schematic structural diagram of an apparatus of a computer device according to an embodiment of this application.

FIG. 16 is a structural block diagram of a computer device 1500 according to an embodiment of this application. The computer device 1500 may be a portable mobile terminal, such as: a smart phone, a tablet computer, a Moving Picture Experts Group Audio Layer III (MP3) player, and a Moving Picture Experts Group Audio Layer IV (MP4) player. The computer device 1500 may be further referred to as another name such as user equipment or a portable terminal.

Usually, the computer device 1500 includes: a processor 1501 and a memory 1502.

The processor 1501 may include one or more processing cores, such as a 4-core processor or an 8-core processor. Processor 1501 may be implemented by using at least one hardware form of a digital signal processor (DSP), a field programmable gate array (FPGA), and a programmable logic array (PLA). The processor 1501 may further include a main processor and a coprocessor. The main processor is a processor configured to process data in an active state, also referred to as a central processing unit (Central Processing Unit, CPU). The coprocessor is a low-power consumption processor configured to process data in a standby state. In some embodiments, processor 1501 may be integrated with a graphics processing unit (GPU). The GPU is configured to be responsible for rendering and drawing content that a display needs to display. In some embodiments, processor 1501 may further include an artificial intelligence (Artificial Intelligence, AI) processor. The AI processor is configured to process computing operations related to machine learning.

Memory 1502 may include one or more computer-readable storage media. The computer-readable storage medium may be tangible and non-transient. Memory 1502 may also include a high-speed random access memory, as well as non-volatile memory, such as one or more disk storage devices and flash storage devices. In some embodiments, the non-transitory computer-readable storage medium in the memory 1502 is configured to store at least one instruction, and the at least one instruction being configured to be executed by the processor 1501 to implement the method for displaying prompt information provided in the embodiments of this application.

In some embodiments, the computer device 1500 may further In some embodiments include: a peripheral device interface 1503 and at least one peripheral device. Specifically, the peripheral device includes at least one of a radio frequency circuit 1504, a touch display screen 1505, an audio circuit 1507, and a power supply 1509.

The peripheral device interface 1503 may be configured to connect at least one peripheral device related to input/output (I/O) to the processor 1501 and the memory 1502. In some embodiments, processor 1501, the memory 1502, and the peripheral device interface 1503 are integrated on the same chip or the same circuit board. In some other embodiments, any one or two of processor 1501, the memory 1502, and the peripheral device interface 1503 may be implemented on a separate chip or circuit board, which is not limited in this embodiment.

RF circuit 1504 is configured to receive and transmit an RF signal, also referred to as an electromagnetic signal. The RF circuit 1504 communicates with a communication network and another communication device by using the electromagnetic signal. The RF circuit 1504 converts an electric signal into an electromagnetic signal for transmission, or converts a received electromagnetic signal into an electric signal. In some embodiments, the RF circuit 1504 includes: an antenna system, an RF transceiver, one or more amplifiers, a tuner, an oscillator, a digital signal processor, a codec chipset, a user identity module card, and the like. The radio frequency circuit 1504 may communicate with other terminals through at least one wireless communication protocol. The wireless communication protocol includes but is not limited to a world wide web, a metropolitan area network, an intranet, generations of mobile communication networks (2G, 3G, 4G, and 5G), a wireless local area network, and/or a wireless fidelity (Wi-Fi) network. In some embodiments, the radio frequency circuit 1504 may also include a circuit related to near field communication (NFC), which is not limited in this application.

The touch display screen 1505 is configured to display a user interface (UI). The UI may include a graph, a text, an icon, a video, and any combination thereof. The touch display screen 1505 also has the capability of collecting a touch signal on or above a surface of the touch display screen 1505. The touch signal may be inputted, as a control signal, to processor 1501 for processing. The touch display screen 1505 is configured to provide a virtual button and/or a virtual keyboard, which is also referred to as a soft button and/or a soft keyboard. In some embodiments, there may be one touch display screen 1505, disposed on a front panel of the computer device 1500; in other some embodiments, there may be at least two touch display screens 1505, disposed on different surfaces of the computer device 1500 respectively or in a folded design; and in still other embodiments, the display screen 1505 may be a flexible display screen, disposed on a curved surface or a folded surface of the computer device 1500. Even, the touch display screen 1505 may be further set in a non-rectangular irregular pattern, namely, a special-shaped screen. The touch display screen 1505 may be made of a material such as a liquid crystal display (LCD) or an organic light-emitting diode (OLED).

The audio circuit 1507 is configured to provide an audio interface between a user and the computer device 1500. The audio circuit 1507 may include a microphone and a speaker. The microphone is configured to collect sound waves from a user and an environment and convert the sound waves into electric signals that are inputted to processor 1501 for processing or to the radio frequency circuit 1504 for voice communication. For the purpose of stereo sound collection or noise reduction, there may be a plurality of microphones, respectively disposed at different parts of the computer device 1500. The microphone may be alternatively an array microphone or an omnidirectional acquisition microphone. The speaker is configured to convert the electrical signals from the processor 1501 or the radio frequency circuit 1504 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio frequency circuit 1507 may further include an earphone jack.

The power supply 1509 is configured to supply power to components in the computer device 1500. The power supply 1509 may be an alternating current, a direct current, a disposable battery, or a rechargeable battery. When the power supply 1509 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the computer device 1500 further includes one or more sensors 1510. The one or more sensors 1510 include but are not limited to: an acceleration sensor 1511, a gyro sensor 1512, a pressure sensor 1513, an optical sensor 1515, and a proximity sensor 1516.

The acceleration sensor 1511 may detect acceleration on three coordinate axes of a coordinate system established by the computer device 1500. For example, the acceleration sensor 1511 may be configured to detect the components of gravitational acceleration on three coordinate axes. The processor 1501 may control, according to a gravity acceleration signal acquired by the acceleration sensor 1511, the touch display screen 1505 to display the user interface in a transverse view or a longitudinal view. The acceleration sensor 1511 may also be configured to acquire game or user motion data.

The gyroscope sensor 1512 may detect a body direction and a rotation angle of the computer device 1500. The gyroscope sensor 1512 may cooperate with the acceleration sensor 1511 to collect a 3D action by the user on the computer device 1500. The processor 1501 may implement the following functions according to the data collected by the gyro sensor 1512: motion sensing (for example, change of the UI based on a tilt operation of the user), image stabilization during photographing, game control, and inertial navigation.

The pressure sensor 1513 may be disposed on a side frame of the computer device 1500 and/or a lower layer of the touch display screen 1505. When the pressure sensor 1513 is disposed at the side frame of the computer device 1500, a holding signal of the user on the computer device 1500 may be detected, and left/right hand identification and a quick operation may be performed according to the holding signal. When the pressure sensor 1513 is disposed at the lower layer of the touch display screen 1405, an operable control on the UI interface can be controlled according to a pressure operation of the user on the touch display screen 1505. The operable control includes at least a button control, a scroll-bar control, an icon control, or a menu control.

The optical sensor 1515 is configured to collect ambient light intensity. In an embodiment, processor 1501 may control the display brightness of the touch display screen 1505 according to the ambient light intensity acquired by the optical sensor 1515. Specifically, when the ambient light intensity is relatively high, the display brightness of the touch display screen 1505 is increased, and when the ambient light intensity is relatively low, the display brightness of the touch display screen 1505 is reduced. In another embodiment, the processor 1501 may further dynamically adjust shooting parameters of a camera component according to the ambient light intensity acquired by the optical sensor 1515.

The proximity sensor 1516, also referred to as a distance sensor, is usually disposed on the front surface of the computer device 1500. The proximity sensor 1516 is configured to collect a distance between the front face of the user and the front surface of the computer device 1500. In an embodiment, when the proximity sensor 1516 detects that the distance between the user and the front surface of the computer device 1500 gradually becomes small, the touch display screen 1501 is controlled by the processor 1505 to switch from a screen-on state to a screen-off state. When the proximity sensor 1516 detects that the distance between the user and the front surface of the computer device 1500 gradually becomes large, the touch display 1501 is controlled by the processor 1505 to switch from the screen-off state to the screen-on state.

A person skilled in the art may understand that the structure shown in FIG. 16 does not constitute any limitation on the computer device 1500, and the computer device may include more components or fewer components than those shown in the figure, or some components may be combined, or a different component deployment may be used.

The embodiments of this application further provide a computer device. The computer device includes a processor and a memory. The memory stores at least one instruction, at least one program, a code set, or an instruction set. The at least one instruction, the at least one program, the code set, or the instruction set is loaded and executed by the processor to implement the method for displaying prompt information according to the foregoing method embodiments.

The embodiments of this application further provide a computer-readable storage medium, storing at least one instruction, at least one program, a code set or an instruction set, the at least one instruction, the at least one program, the code set or the instruction set being loaded and executed by a processor to implement the method for displaying prompt information according to the foregoing method embodiments.

The embodiments of this application further provide a computer program product, the computer program product storing at least one instruction, at least one program, a code set or an instruction set, and the at least one instruction, the at least one program, the code set or the instruction set being loaded and executed by a processor to implement the method for displaying prompt information according to the foregoing method embodiments.

What is claimed is:

1. A method for displaying prompt information in a computer game, performed by a terminal, the method comprising:

displaying a virtual character selection interface of a current game, the virtual character selection interface including a selected character region and a candidate character region;

receiving, from a server, synchronization information indicating that a teammate selected a first virtual character for a team lineup, and displaying an avatar of the first virtual character in a friendly avatar area in the selected character region;

obtaining an attribute of the first virtual character selected by the teammate for the team lineup;

updating display content in the candidate character region based on the attribute of the first virtual character, including: removing, in the candidate character region, display of an avatar frame of a first candidate virtual character having an attribute that is the same as the attribute of the first virtual character, and displaying, in the candidate character region, an avatar frame of a second candidate virtual character having an attribute that is different from the attribute of the first virtual character;

displaying, in response to a selection operation comprising a pre-selection operation on a candidate virtual character by a user of the terminal, prompt information based on the attribute of the first virtual character and an attribute of the candidate virtual character, the prompt information indicating whether the attribute of the candidate virtual character is the same as or different from the attribute of the first virtual character, the pre-selection operation selecting the candidate virtual character without any confirmation operation;

removing display of the prompt information in response to a selection operation on another virtual character;

receiving a confirmation operation on the candidate virtual character; and selecting the candidate virtual character as a second virtual character for the team lineup in response to the confirmation operation received by the terminal.

2. The method according to claim 1, wherein the attribute is a category indicator.

3. The method according to claim 2, wherein the prompt information indicates an overlap of categories when the category indicators of the first virtual character and the candidate virtual character are same.

4. The method according to claim 2, wherein the category indicator indicates the recommended task for the candidate virtual character in a computer game.

5. The method according to claim 1, wherein the first virtual character selected by the teammate is displayed in the selected character region, and the candidate virtual character is displayed in the candidate character region, the selected character region and the candidate character region being separated in a user interface.

6. The method according to claim 5, wherein the prompt information is displayed in the candidate character region.

7. The method according to claim 6, wherein the prompt information is displayed in proximity of the candidate virtual character.

8. The method according to claim 1, further comprising:

monitoring in real time the first virtual character selected by the teammate and the candidate virtual character selected by the user.

9. The method according to claim 1, wherein the prompt information comprises at least one of: text, picture, and animation.

10. A computer device, the computer device comprising: a processor and a memory, the memory storing at least one program, the at least one program being loaded and executed by the processor to perform a method for displaying prompt information in a computer game, the method comprising:

displaying a virtual character selection interface of a current game, the virtual character selection interface including a selected character region and a candidate character region;

receiving, from a server, synchronization information indicating that a teammate selected a first virtual character for a team lineup, and displaying an avatar of the first virtual character in a friendly avatar area in the selected character region;

obtaining an attribute of the first virtual character selected by the teammate for the team lineup;

updating display content in the candidate character region based on the attribute of the first virtual character, including: removing, in the candidate character region, display of an avatar frame of a first candidate virtual character having an attribute that is the same as the attribute of the first virtual character, and displaying, in the candidate character region, an avatar frame of a second candidate virtual character having an attribute that is different from the attribute of the first virtual character;

displaying, in response to a selection operation comprising a pre-selection operation on a candidate virtual character by a user of the computer device, prompt information based on the attribute of the first virtual character and an attribute of the candidate virtual character, the prompt information indicating whether the attribute of the candidate virtual character is the same as or different from the attribute of the first virtual character, the pre-selection operation selecting the candidate virtual character without any confirmation operation;

removing display of the prompt information in response to a selection operation on another virtual character;

receiving a confirmation operation on the candidate virtual character; and selecting the candidate virtual character as a second virtual character for the team lineup in response to the confirmation operation received by the computer device.

11. The computer device according to claim 10, wherein the attribute is a category indicator.

12. The computer device according to claim 11, wherein the prompt information indicates an overlap of categories when the category indicators of the first virtual character and the candidate virtual character are same.

13. The computer device according to claim 11, wherein the category indicator indicates the recommended task for the candidate virtual character in a computer game.

14. The computer device according to claim 10, wherein the first virtual character selected by the teammate is displayed in the selected character region, and the candidate virtual character is displayed in the candidate character region, the selected character region and the candidate character region being separated in a user interface.

15. The computer device according to claim 14, wherein the prompt information is displayed in the candidate character region.

16. The computer device according to claim 15, wherein the prompt information is displayed in proximity of the candidate virtual character.

17. The computer device according to claim 10, further comprising:

monitoring in real time the first virtual character selected by the teammate and the candidate virtual character selected by the user.

18. The computer device according to claim 10, wherein the prompt information comprises at least one of: text, picture, and animation.

19. A non-transitory computer-readable storage medium, the computer-readable storage medium storing at least one computer program, the at least one computer program being loaded and executed by one or more processors to perform a method for displaying prompt information in a computer game, the method comprising:

displaying a virtual character selection interface of a current game, the virtual character selection interface including a selected character region and a candidate character region;

receiving, from a server, synchronization information indicating that a teammate selected a first virtual character for a team lineup, and displaying an avatar of the first virtual character in a friendly avatar area in the selected character region;

obtaining an attribute of the first virtual character selected by the teammate for the team lineup;

updating display content in the candidate character region based on the attribute of the first virtual character, including: removing, in the candidate character region, display of an avatar frame of a first candidate virtual character having an attribute that is the same as the attribute of the first virtual character, and displaying, in the candidate character region, an avatar frame of a second candidate virtual character having an attribute that is different from the attribute of the first virtual character;

displaying, in response to a selection operation comprising a pre-selection operation on a candidate virtual character by a user of a terminal, prompt information based on the attribute of the first virtual character and an attribute of the candidate virtual character, the prompt information indicating whether the attribute of the candidate virtual character is the same as or different from the attribute of the first virtual character, the pre-selection operation selecting the candidate virtual character without any confirmation operation;

removing display of the prompt information in response to a selection operation on another virtual character;

receiving a confirmation operation on the candidate virtual character; and selecting the candidate virtual character as a second virtual character for the team lineup in response to the confirmation operation received by the terminal.

20. The non-transitory computer-readable storage medium according to claim 19, wherein the attribute is a category indicator.

* * * * *